US012602698B1

(12) United States Patent
Sobkowski

(10) Patent No.: US 12,602,698 B1
(45) Date of Patent: Apr. 14, 2026

(54) TRANSFORMATION OF NON-COMPLIANT STIMULUS/RESPONSE SYSTEM TO OPERATIONAL GOVERNANCE COMPLIANT ETHICAL ARTIFICIAL INTELLIGENCE THROUGH THE USE OF DYNAMIC GOVERNANCE GUIDERAILS DIRECTIVES AND EXECUTOR

(71) Applicant: Isidore S. Sobkowski, Stamford, CT (US)

(72) Inventor: Isidore S. Sobkowski, Stamford, CT (US)

( * ) Notice: Subject to any disclaimer, the term of this patent is extended or adjusted under 35 U.S.C. 154(b) by 0 days.

(21) Appl. No.: 19/193,679

(22) Filed: Apr. 29, 2025

(51) Int. Cl.
*G06Q 30/018* (2023.01)

(52) U.S. Cl.
CPC ................................. *G06Q 30/018* (2013.01)

(58) Field of Classification Search
CPC .................................................. G06Q 30/018
See application file for complete search history.

(56) References Cited

U.S. PATENT DOCUMENTS 11,822,885 B1 * 11/2023 Sundararaman .... G06F 16/3344
2022/0277140 A1 * 9/2022 Rhim ..................... G06Q 50/18

FOREIGN PATENT DOCUMENTS

WO WO-2023242540 A1 * 12/2023 ............ G06F 16/93

OTHER PUBLICATIONS

R. V. K. Bevara, T. Xiao, F. Hosseini and J. Ding, "Bias Analysis in Language Models using An Association Test and Prompt Engineering," 2023 IEEE 23rd International Conference on Software Quality, Reliability, and Security Companion (QRS-C), Chiang Mai, Thailand, 2023, pp. 356-363 (Year: 2023).*

* cited by examiner

*Primary Examiner* — Jessica Lemieux
*Assistant Examiner* — Emily M. Kraisinger
(74) *Attorney, Agent, or Firm* — US IP Counsel; Siamak S. Hefazi

(57) ABSTRACT

A system and method to derive a multitude of Dynamic Governance Guiderail Directives—singularly, each one referred to as a Directive from a governance specification that comprises ethical standards, legal requirements, operational methods, and societal expectations. The collection of the multitude of individual directives comprises a directive Library. A directive Executor comprising semantic processing, analytics, dynamic monitoring, real-time feedback mechanisms, and adaptive control protocols that operates over a Non-Compliant System in concert with the directive Library to ensure compliance with the governance specification thereby transforming the Non-Compliant System into a Compliant system.

18 Claims, 6 Drawing Sheets

GovernanceDirectivePayload: "Avoid recommending high-risk investments to clients with low-risk tolerance.",
Rational Insights:
    Why: "To protect clients with low-risk tolerance from potential financial losses and ensure
    recommendations align with their financial goals."
    Explain: "High-risk investments carry a greater potential for loss, which is unsuitable for clients who
    prioritize capital preservation. Low-risk tolerance indicates a preference for stable and predictable returns."
    Help: "Consult client's risk profile, investment history, and financial goals before making recommendations.
    Utilize risk assessment tools to determine appropriate investment strategies. Refer to approved lists of low-
    risk investment options."
Extended Insights:
    Timestamp: "2023-10-27T10:00:00Z",
    Source: "Organizational Financial Governance Document, Section 4.2"
    SourceVersion: "1.3"
    SourceAuthor: "Financial Compliance Department"
    SemanticVector: "[0.2, 0.8, 0.1, 0.5, ...]"
    SourceConstraints:
        Permissible: "Client Risk Profile Database", "Approved Low-Risk Investment List", "Financial
        Regulatory Compliance Manual", "Internal Financial Advisor Guidelines"
        Impermissible: "Unverified online financial forums", "Social media investment tips", "Any source that
        has not been approved by the financial compliance department."
Confidence Score: 92

Example of DGGD textual detail.

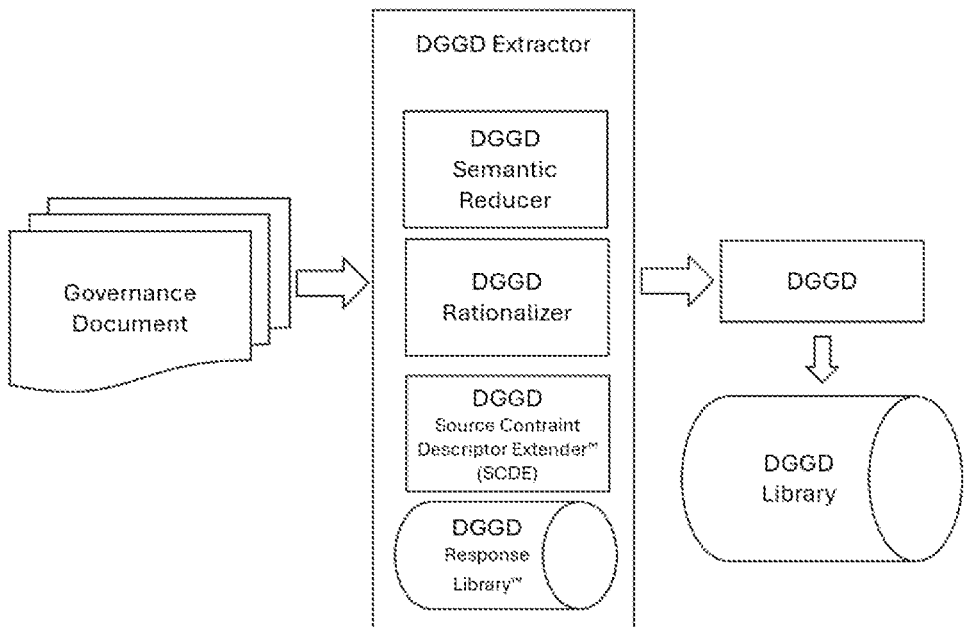
Figure 1: DGGD Extractor Detail.

| DGGD Governance Directive Payload | DGGD Rational Insights | DGGD Extended Insights | DGGD Confidence Score |
|---|---|---|---|

Figure 2: DGGD Layout.

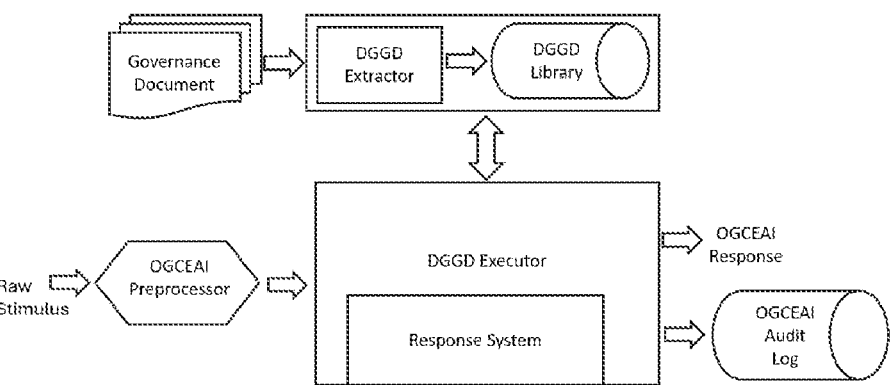
Figure 3: OGCEAI Response Layout.

Figure 4:
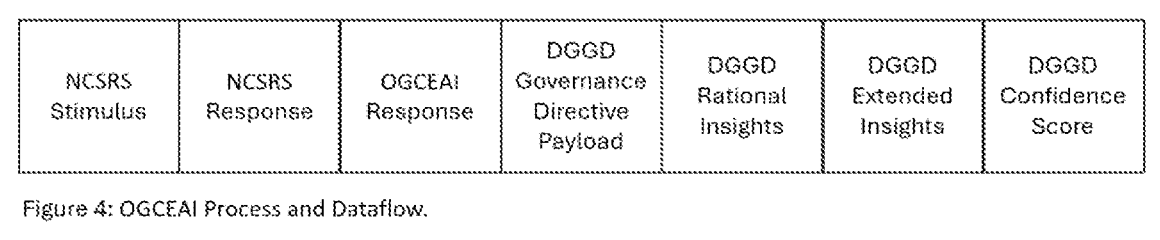

| NCSRS Stimulus | NCSRS Response | OGCEAI Response | DGGD Governance Directive Payload | DGGD Rational Insights | DGGD Extended Insights | DGGD Confidence Score |
|---|---|---|---|---|---|---|

Figure 4: OGCEAI Process and Dataflow.

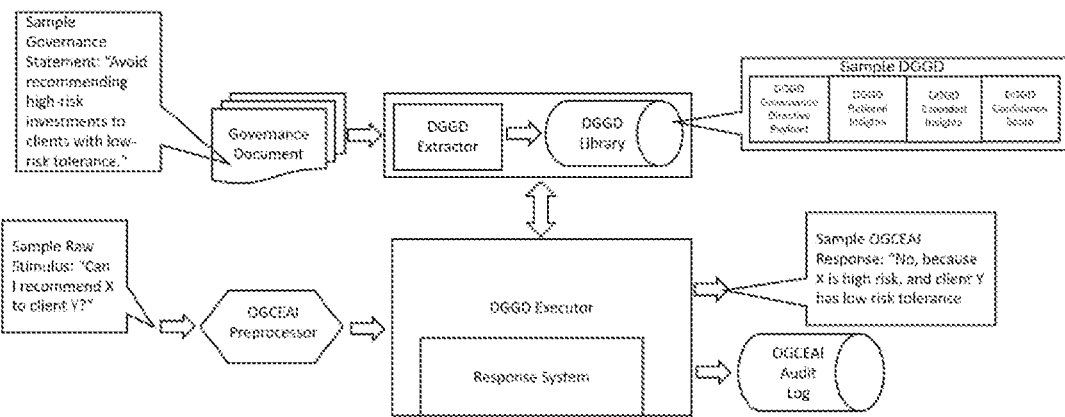
Figure 5: A Financial Example.

Figure 6:
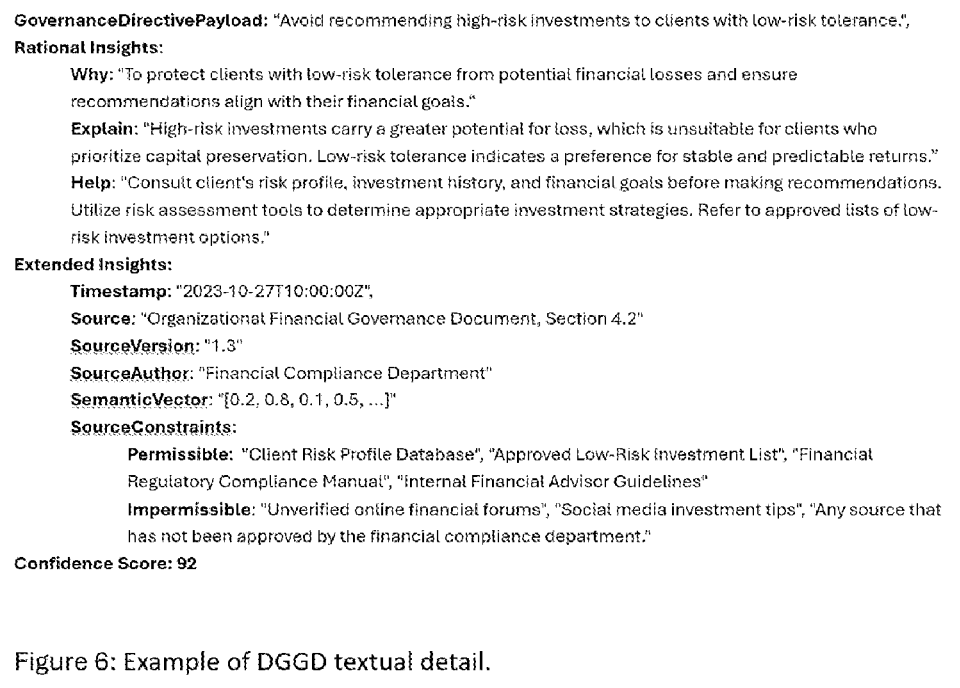

GovernanceDirectivePayload: "Avoid recommending high-risk investments to clients with low-risk tolerance.",
Rational Insights:

> Why: "To protect clients with low-risk tolerance from potential financial losses and ensure recommendations align with their financial goals."
>
> Explain: "High-risk investments carry a greater potential for loss, which is unsuitable for clients who prioritize capital preservation. Low-risk tolerance indicates a preference for stable and predictable returns."
>
> Help: "Consult client's risk profile, investment history, and financial goals before making recommendations. Utilize risk assessment tools to determine appropriate investment strategies. Refer to approved lists of low-risk investment options."

Extended Insights:

> Timestamp: "2023-10-27T10:00:00Z",
>
> Source: "Organizational Financial Governance Document, Section 4.2"
>
> SourceVersion: "1.3"
>
> SourceAuthor: "Financial Compliance Department"
>
> SemanticVector: "[0.2, 0.8, 0.1, 0.5, ...]"
>
> SourceConstraints:
>
>> Permissible: "Client Risk Profile Database", "Approved Low-Risk Investment List", "Financial Regulatory Compliance Manual", "Internal Financial Advisor Guidelines"
>>
>> Impermissible: "Unverified online financial forums", "Social media investment tips", "Any source that has not been approved by the financial compliance department."

Confidence Score: 92

Figure 6: Example of DGGD textual detail.

TRANSFORMATION OF NON-COMPLIANT STIMULUS/RESPONSE SYSTEM TO OPERATIONAL GOVERNANCE COMPLIANT ETHICAL ARTIFICIAL INTELLIGENCE THROUGH THE USE OF DYNAMIC GOVERNANCE GUIDERAILS DIRECTIVES AND EXECUTOR

FIELD OF THE INVENTION

The present invention relates to the fields of Artificial Intelligence, Artificial Intelligence Governance, Ethical Artificial Intelligence, and Responsible Artificial Intelligence.

BACKGROUND

AI Governance refers to the frameworks, policies, and ethical guidelines established to ensure the responsible development, deployment, and oversight of artificial intelligence systems.

Traditional methods of AI governance rely on written documents that outline legal frameworks and technical standards that aim to ensure that AI systems are developed and deployed in a manner that comports with an organization's standards.

Prior art predominantly focuses on developing and disseminating these administrative governance documents. These documents typically serve as internal guidelines for organizations, informing decision-making processes with relevant regulations. However, they do not provide a mechanism for dynamically translating these high-level principles into real-time operational controls for AI systems.

This disconnect, between the abstract principles outlined in governance documents and the concrete actions required for Ethical and Responsible AI processes and real-time AI operations, comprising transparency, explainability, accountability, and acting over current and up-to-date governance, necessitates a paradigm shift towards more dynamic and actionable AI governance frameworks.

SUMMARY OF THE INVENTION

The instant invention addresses the critical gap between the abstract principles outlined in governance documents and the concrete dynamic actions required for Ethical and Responsible AI processes in batch and real-time AI operations, comprising transparency, explainability, and accountability, acting in accordance with current and up-to-date governance guidelines.

This gap is overcome by introducing a novel approach that seamlessly translates governance documents into a set of Dynamic Governance Guiderail Directives™ (DGGD™). These DGGD are not merely passive guidelines; they are operationalized into real-time AI governance guiderail controls that actively govern the behavior of Non-Compliant Stimulus/Response System™ (NCSRS™), such as AI systems, thus transforming NCSRS into Operational Governance Compliant Ethical Artificial Intelligence™ (OGCEAI™). The instant invention is a transformative shift that moves beyond the traditional administrative role of governance documents to establish a dynamic and responsive framework that transforms NCSRS into operational OGCEAI.

The set of DGGDs (also called the DGGD Library™), in conjunction with a DGGD Executor™, operationalizes governance by bridging the gap between abstract governance principles as available from governance documents and the concrete, real-time Ethical and Responsible actions of the OGCEAI systems. The DGGD Executor is a dynamic interpreter, continuously monitoring the NCSRS's behavior and enforcing the governance guiderails encoded within the DGGD Library resulting in OGCEAI.

BRIEF DESCRIPTION OF THE FIGURES

FIG. 1: DGGD Extractor Detail.
FIG. 2: DGGD Layout.
FIG. 3: OGCEAI Response Layout.
FIG. 4: OGCEAI Process and Dataflow.
FIG. 5: A Financial Example.
FIG. 6: Example of DGGD textual detail.

DETAILED DESCRIPTION OF THE INVENTION

Glossary of Terms

Artificial Intelligence (AI) is the development and deployment of computer systems that can perform tasks typically requiring human intelligence that may or may not be compliant with governance.

AI Governance is the framework of policies, regulations, and guidelines for the development, deployment, and use of artificial intelligence technologies.

Governance Document (aka Governance Specification) is a document or set of documents, specification or set of specifications, policy or set of policies, including ad hoc or vetted changes that define governance. The governance document can explicitly state, or incorporate by reference, relevant information comprising governance of AI, IT, data, security, cloud, interactions, etc. The governance document can range from something as simple as a single word or a lengthy and complex document.

Ethical AI (EAI) is the development and use of artificial intelligence systems in a way that respects human rights, fairness, transparency, accountability, and organizational vision and mission.

Responsible AI (RAI) is the development and use of AI in a way that is ethical, safe, and beneficial to society and an organization.

Non-Compliant Stimulus/Response System™ (NCSRS™) is any system that, upon receiving an input (stimulus), generates an output (response) that may or may not operationally adhere to a predefined set of governance guidelines, specifications, or standards relevant to its function or purpose.

Guiderail is a written guideline defined in a governance document.

Real-time is a process that produces a response within a timeframe that is perceived as immediate or sufficiently fast for the task at hand, including batch tasks.

Dynamic AI are AI batch processes and/or real-time AI operations.

Query (or Stimulus) is any request to a computer system for information or action through an input (single or multimodal), comprising: traditional text-based questions or prompts; machine-generated signals emanating from sensor data; automated alerts; IoT signals; computer interaction; API call; or human interactions through verbal commands, gestures, or biometric inputs.

Response is output from a computer system generated as a consequence of processing a query, through a single or multimodal output, comprising: traditional text-based questions or prompts; machine-generated signals emanating from sensor data; automated alerts; IoT signals; computer interaction; API call; or human interactions through verbal commands, gestures, or biometric outputs.

Dynamic Governance Guiderail Directive™ (DGGD™) is the inventive specific, actionable semantic object derived from a governance document. A single DGGD or a multitude of DGGDs can be derived from a governance document, depending on the complexity or completeness of the governance document.

Dynamic Governance Guiderail Directive Library™ (DGGD Library™) is the inventive set of a single DGGD or a multitude of DGGDs.

DGGD Extractor™ is the inventive system, comprised of a DGGD Semantic Reducer, a DGGD Rationalizer, and a DGGD Source Constraint Descriptor Extender, that continuously monitors the Governance Document and translates and transforms governance principles contained in a Governance Document into actionable, specific directives that can be enforced. The output of the DGGD Extractor is a set of DGGDs, collectively forming a DGGD Library.

DGGD Semantic Reducer™ is the inventive system that transforms governance document concepts into DGGD Governance Directive Payloads.

DGGD Governance Directive Payload is the inventive symbolic representation of a governance concept.

DGGD Rationalizer™ is the inventive system that constructs the "why," the "explain," and the "help" descriptors, collectively, the "DGGD rational descriptors", where the DGGD rational descriptors are meta-tags defined as: "Why": that articulates the rationale or motivation behind a governance directive; "Explain": that provides a detailed clarification of how the directive applies or operates; and, "Help": that offers practical guidance or resources for compliance or understanding.

The triadic meta-tags "why," "explain," and "help" are context-sensitive labels attached to each DGGD, providing, respectively, the associated text rationale behind the directive, a detailed clarification of its application, and practical guidance for compliance, respectively.

DGGD Insights™ are the inventive descriptors comprising a Time stamp; Source of a response; Version identifier of the source of a response; Author identifier of a response, Semantic Vector of a response; among others.

DGGD Insight Content™ is the inventive content of each respective DGGD Insight.

DGGD Response Library™ is the inventive set of sources from which a response can be sought.

DGGD Source Constraint Descriptor Extender™ (SCDE™) is the inventive system that extends the descriptors associated with DGGDs to explicitly include constraints on permissible response sources.

DGGD Confidence Assessor™ is the inventive system that automatically generates a confidence score for each DGGD by evaluating the clarity, specificity, and coherence of its source text, meta-tags, and source constraints, aiding the DGGD Executor in prioritizing reliable directives for real-time enforcement.

DGGD Executor™ is the inventive system that operationalizes the Dynamic Governance Guiderail Directives (DGGDs). It acts as a dynamic interpreter and enforcer of these directives, bridging the gap between abstract governance principles and the real-time actions of OGCEAI. Working in conjunction with the DGGD Library (the collection of DGGDs derived from governance specifications), the DGGD Executor continuously monitors NCSCS behavior and ensures compliance with the defined governance guiderails articulated in the governance document as embodied in the extracted and completed DGGDs in the DGGD Library. It uses semantic processing, analytics, dynamic monitoring, real-time feedback, search, and adaptive control to transform a NCSRS into a Operational Governance Compliant Ethical Artificial Intelligence™ (OGCEAI™) system. Essentially, it is the mechanism that translates governance principles into concrete, actionable controls for CGEAI, ensuring ethical and responsible OGCEAI operations.

Operational Governance Compliant Ethical Artificial Intelligence™ (OGCEAI™) is the inventive system that dynamically and operationally conform to an up-to-date governance document under the monitoring and control of the DGGD Executor with reference to the DGGD Library, to ensure NCSRS operates in accordance with the governance document.

Morality, Ethics, Responsibility, Governance, Ethical AI and Responsible AI

Subjective morality, the adherence to principles guiding behavior, evolves into collective ethics, which are then institutionalized through governance, thereby providing the foundational structure necessary for the development and deployment of Ethical AI (EAI) and Responsible AI (RAI).

Morality is subjective but solidifies into ethics when individual beliefs and values are collectively shared, debated, and refined within a community. Subjective morality stems from personal experiences and cultural backgrounds. As these subjective moralities converge, common principles emerge, forming a more cohesive set of guidelines that the community collectively agrees upon and abides by—this collective set of principles and values becomes ethics. Essentially, ethics can be viewed as a codified version of subjective moral beliefs that have been validated and upheld by a larger societal consensus.

Similarly, ethics reduces to governance when ethical principles are formally institutionalized and enforced through laws, policies, and regulations. Governance is the mechanism through which ethical standards are operationalized and maintained within society. By establishing regulations based on ethical principles, governance systems attempt to ensure that these standards are consistently applied and upheld. This process of reducing ethics to governance creates a structured framework for ensuring accountability, fairness, and justice within a community or organization.

Responsibility, as outlined in a governance document, describes AI systems are developed and used in a way that is ethical, fair, accountable, and provides for the good of the organization or community. This includes taking steps to prevent bias, discrimination, and other harmful outcomes, as well as being transparent about how AI systems work and who is responsible for their actions. Ultimately, EAI and RAI are about ensuring that AI benefits society as a whole in an ethical and responsible way.

DGGD, DGGD Library, DGGD Extractor, DGGD Executor, DGGD Rationalizer, DGGD Confidence Assessor, NCSRS and OGCEAI The instant invention bridges the gap between abstract governance guidelines and operational AI governance, thus transforming NCSRS into OGCEAI (see FIG. 4).

DGGD Extractor is a novel facet of the inventive system that continuously monitors a Governance Document (or a collection of Governance Documents) and translates the governance principles contained within it into actionable and specific directives called Dynamic Governance Guiderail Directives™ (DGGDs™). The output of this process is a collection of these DGGDs, which collectively form the DGGD Library™.

The DGGD Extractor is the crucial bridge between abstract governance principles outlined in a governance document and the operationalization of these principles into actionable directives that are enforced by the DGGD Executor thus transforming a NCSRS into OGCEAI. The DGGD Extractor ensures that the DGGD Library is continuously updated to reflect the current governance specifications.

FIG. 4, DGGD Extractor Detail, explicitly depicts that a governance document is supplied as input to the DGGD Extractor, which then performs a multistep process to create a set of individual DGGDs and the DGGD Library.

The DGGD Extractor is comprised of four inventive subsystems: DGGD Semantic Reducer™ DGGD Rationalizer™, the DGGD Source Constraint Descriptor Extender™ (SCDE™), and The DGGD Confidence Assessor™.

Each inventive sub-system is described in detail, below:
The DGGD Semantic Reducer The DGGD Semantic Reducer is an innovative subsystem that processes and distills high-level governance concepts from a governance specification into DGGD Governance Directive Payloads™. These payloads are the foundational building blocks of each of the respective individual DGGDs, which are actionable semantic objects that guide and constrain the OGCEAI behavior in real-time.

The DGGD Semantic Reducer is a translator, taking complex, abstract principles (e.g., "ensure fairness" or "maintain transparency") and reduces them into concise, machine-readable directives that are operationalized by the DGGD Executor™. This process ensures that governance principles are not left as static, passive guidelines but are instead transformed into operational, active, enforceable controls within the OGCEAI system.

DGGD Semantic Reducer Process

Input Process

The Semantic Reducer takes as input a governance document, e.g., "AI systems must comply with data protection laws, including GDPR". The Semantic Reducer then applies advanced techniques comprising natural language processing (NLP), semantic analysis, and statistical processing to interpret and break down the governance document into its constituent concepts.

Concept Transformation

The Semantic Reducer identifies key governance principles within the governance document (e.g., fairness, transparency, accountability) and reduces them individually and respectively into simplified, symbolic representations known as DGGD Governance Directive Payloads™. For example, a governance statement such as "Avoid recommending high-risk investments to clients with low-risk tolerance" is reduced to a payload such as: "DGGD Payload: Restrict high-risk investment recommendations; Condition: Client risk tolerance is low."

Output Generation

The resulting DGGD Governance Directive Payloads are machine-readable, actionable representations of governance concepts that encapsulate the intent and constraints of the original specification. These payloads are then passed to other components of the DGGD Extractor (e.g., the DGGD Rationalizer™ for further enrichment with triadic contextual descriptors "why", "explain", and "help"), as a step to becoming fully formed DGGDs.

Key Features of the DGGD Semantic Reducer™

The DGGD Semantic Reducer bridges the gap between abstract human-defined governance principles and concrete, operational directives by distilling complex ideas into precise, enforceable directives. By leveraging NLP and semantic analysis, the DGGD Semantic Reducer ensures that the meaning and intent of the governance specification are preserved in the resulting payloads. The process is automated, minimizing human error and enabling rapid processing of governance documents, even as they evolve or expand. The payloads generated by the DGGD Semantic Reducer are the core elements that allow the DGGD Executor to enforce governance in real-time, transforming an NCSRS into an OGCEAI system.

DGGD Semantic Reducer Example

Consider a governance specification stating: "AI systems should promote inclusivity and prevent discrimination." The DGGD Semantic Reducer will analyze the text using NLP, semantic, and statistical tools; extract the core concept: "promote inclusivity and prevent discrimination; reduce it to a DGGD Governance Directive Payload, such as: "DGGD Payload: Ensure outputs are inclusive and non-discriminatory; Condition: Applies to all user interactions."

This payload would then be enriched by the Rationalizer (e.g., by applying triadic "Why: Promoting inclusivity and preventing discrimination ensures that AI systems fairly serve all users and uphold ethical standards of equality;" "Explain: This directive requires AI to generate outputs that avoid bias and accommodate diverse user backgrounds, making its decisions equitable and accessible;" and, "Help: Refer to the Inclusivity and Anti-Discrimination Guidelines for best practices on designing AI that supports diverse needs and mitigates discriminatory outcomes."), and further applying the Source Constraint Descriptor Extender™ (e.g., adding "Permissible sources: Approved inclusivity guidelines").

Significance and Novelty

The DGGD Semantic Reducer is a novel element in AI governance because it addresses a critical gap in traditional frameworks; specifically, traditional systems do not have the ability to dynamically translate high-level principles into real-time operational ethical AI governance controls. Unlike static governance documents or prior art systems that focus on post-hoc analysis (e.g., LIME or SHAP), the inventive Semantic Reducer enables proactive, real-time governance by creating actionable directives that are enforced as part of the OGCEAI. Its integration into a broader agentic framework further enhances its scalability and adaptability, making it a cornerstone of the OGCEAI transformation process.

The DGGD Rationalizer™

The DGGD Rationalizer, in real-time consultation with the DGGD Payloads and the governance document as input submitted to an LLM, creates triadic "why", "explain", and "help" meta-tag labels and respective context-sensitive text for each DGGD that is inserted as "lable: text" format into the given DGGD.

The triadic "why," "explain," and "help" meta-tags in the disclosed invention are novel and distinct from prior art, as can be seen by closely examining their specific implementation, purpose, and integration within the OGCEAI system, and as compared to existing technologies in AI governance, explainable AI (XAI), and user-support frameworks.

These meta-tags introduce yet another one of many new concepts of the invention and are a unique application that has not been anticipated by prior art.

DGGD Confidence Assessor™

The DGGD creation process, executed by the DGGD Extractor, novelly employs the DGGD Confidence Assessor™ to automatically generate a confidence score for each DGGD to aid the DGGD Executor in enforcement.

The DGGD Extractor, comprising the DGGD Semantic Reducer, Rationalizer, and Source Constraint Descriptor Extender (SCDE), processes a governance specification using natural language processing (NLP), semantic analysis, and statistical techniques.

The Semantic Reducer distills governance concepts into DGGD payloads, and the DGGD Confidence Assessor, using methods comprising LLM comparisons, numerical and statistical analysis, semantic analysis, and NLP, assigns an initial confidence score based on the clarity and specificity of the source text (e.g., unambiguous legal terms are assigned a relatively higher confidence score than ambiguous ones). The Rationalizer enhances the confidence score by evaluating the coherence of generated "why," "explain," and "help" meta-tags using a Large Language Model, adjusting each confidence score based on semantic consistency. The SCDE further refines the confidence score by assessing the reliability of source constraints (e.g., verified databases vs. ambiguous references).

The final confidence score, stored within each DGGD in the DGGD Library, reflects the directive's robustness and reliability, enabling the DGGD Executor to prioritize high-confidence DGGDs during real-time enforcement, ensuring accurate and compliant AI responses.

DGGD Triadic Meta-Tags™

The invention discloses the novelty of the DGGD Triadic Meta-Tags, specifically "why," "explain," and "help", as integral components of each DGGD. The DGGD Triadic Meta-Tags are typically, but not necessarily, represented as a 3-tuple.

The text associated respectively with each of these meta-tags is generated by the DGGD Rationalizer module using the governance document and DGGD Payload as input; and, receiving and associating the respective LLM generated text as a foundational aspect of each DGGD.

During operations, the contents of each mega-tag are systematically appended to OGCEAI responses, audit trails, and governance enforcement actions. The triadic meta-tags enhance transparency, explainability, and usability in real-time AI governance.

As an example of the triadic meta-tags, consider: ("Why: to protect clients with low-risk tolerance from potential financial losses"; "Explain: high-risk investments carry a greater potential for loss, which conflicts with the client's risk profile"); "Help: "consult the client's risk profile database or refer to the low-risk investment guide").

Comparison to Prior Art

The inventive "why," "explain," and "help" meta tags, and their associated respective text, differentiate the present invention from prior art in the fields of Explainable AI (XAI), AI governance, and user-support systems.

Prior Art in Explainable AI (XAI)

LIME (Local Interpretable Model-Agnostic Explanations): Since 2016, LIME explains AI predictions by highlighting feature contributions (e.g., "this feature increased the prediction score by 0.3"). It focuses on how a model works but lacks explicit "why," "explain," and "help" meta tags rationales or guidance.

SHAP (SHapley Additive explanations): Introduced circa 2017, SHAP assigns importance values to inputs. It is model-centric, not governance-focused, and lacks explicit "why," "explain," and "help" meta-tags rationales or guidance.

Google's What-If Tool: The invention, with its DGGDs and triadic "why," "explain," and "help" meta-tags, is an innovative leap over Google's What-If Tool, released around 2018, which focuses on visualizing and analyzing machine learning model behavior interactively.

The What-If Tool provides post-hoc commentaries by allowing users to manipulate inputs and observe outcomes (e.g., "changing X alters Y"); it lacks a structured, governance-driven framework for real-time enforcement.

In contrast, the invention's meta-tags, generated dynamically by the DGGD Rationalizer using a Large Language Model, are embedded within an operational pipeline that transforms a Non-Compliant Stimulus/Response System into a Governance Compliant Ethical AI (OGCEAI). This ad hoc and proactive, real-time governance integration ensures ethical compliance during ethical and responsible AI operation, unlike the What-If Tool's retrospective, user-driven analysis.

The invention's "why," "explain," and "help" meta-tags form a novel triadic structure absent in Google's What-If Tool. The novel "why" tag articulates the rationale behind a directive (e.g., "to protect clients from financial loss"), the novel "explain" tag clarifies its application (e.g., "high-risk options were filtered"), and the novel "help" tag provides actionable guidance (e.g., "consult the risk profile guide").

In contrast, Google's What-If Tool offers visualizations and basic explanations of model decisions without standardized, and without governance-focused annotations or user support mechanisms.

The invention's triadic meta-tags are systematically appended to responses and audit trails, enhancing transparency and accountability in real-time, whereas Google's What-If Tool outputs are not integrated into operational AI or tied to enforceable governance principles.

Furthermore, the invention's agentic framework and DGGD Executor enable continuous monitoring and adaptation to evolving governance specifications, ensuring compliance across diverse contexts like finance or healthcare or any other domain. The What-If Tool, designed for model developers to explore hypothetical scenarios, lacks this dynamic enforcement and scalability.

By operationalizing abstract ethical principles into concrete, enforceable directives with comprehensive triadic meta-tags, the invention addresses a critical gap in AI governance that the What-If Tool does not, marking a transformative advance in ensuring ethical and responsible AI behavior.

Prior Art in AI Governance

IBM's AI Explainability 360 toolkit, introduced in 2019, while valuable for providing post-hoc explanations of AI model decisions through metrics and visualizations (e.g., fairness metrics or feature importance), is inferior to the invention's triadic meta-tags ("why," "explain," "help") because it lacks real-time, governance-driven integration and a structured, user-centric explanatory framework.

The IBM toolkit focuses on analyzing model mechanics after decisions are made, offering insights primarily for developers, without embedding ethical rationales or actionable guidance directly into ethical and responsible AI operations. In contrast, the invention's meta-tags are dynamically generated by the DGGD Rationalizer using a Large Language Model, seamlessly integrated into the DGGD Executor's real-time pipeline, and appended to every AI response and audit trail. This ensures proactive ethical compliance, transparency, and user empowerment through context-sensitive rationales ("why"), detailed clarifications ("explain"), and practical resources ("help"), addressing governance requirements in operational contexts like finance or healthcare, which IBM's toolkit does not achieve with comparable depth or immediacy.

Google's Model Cards: Introduced in 2020, Google's Model Cards provide static documentation of a model's intent, performance, and usage guidelines, offering a snapshot of ethical considerations like fairness but lacking real-time integration into AI operations. In contrast, the invention's triadic meta-tags ("why," "explain," "help") are dynamically generated by the DGGD Rationalizer using a Large Language Model and embedded within the operational pipeline of the OGCEAI system. These meta-tags proactively deliver context-sensitive rationales, clarifications, and actionable guidance for each governance directive, enhancing transparency, explainability, and user empowerment in real-time. Unlike Model Cards, which are external, retrospective reports not tied to live enforcement, the triadic meta-tags are systematically appended to responses and audit trails, ensuring continuous compliance and adaptability to evolving governance, making them a superior, operationalized approach to ethical AI governance.

Anthropic's Constitutional AI: This system, disclosed in 2023, embeds ethical principles into AI behavior through a static "constitution," and is therefore distinct and inferior to the invention's novel triadic meta-tags ("why," "explain," "help") due to its lack of dynamic, real-time adaptability and structured transparency.

Constitutional AI relies on predefined principles that require retraining or fine-tuning to incorporate new governance rules, limiting its responsiveness to evolving regulations or contexts. In contrast, the invention's meta-tags, generated dynamically by the DGGD Rationalizer and enforced by the DGGD Executor, provide context-sensitive rationales, clarifications, and actionable guidance in real-time, seamlessly adapting to updated governance specifications.

The invention's triadic framework enhances transparency, explainability, and user empowerment by systematically appending meta-tags to responses and audit trails, offering a traceable, user-centric governance model that surpasses Constitutional AI's rigid, less granular approach.

Prior Art in User Support

The Microsoft Azure Bot Service, while effective for delivering conversational AI and contextual user support, is inferior to the invention's triadic meta-tags ("why," "explain," "help") because it lacks a structured, governance-driven framework for real-time ethical AI enforcement. Azure Bot Service focuses on pre-programmed or learned responses to enhance user interaction but does not systematically embed ethical rationales, detailed clarifications, or actionable guidance tied to governance principles within its responses. In contrast, the invention's meta-tags, dynamically generated by the DGGD Rationalizer using a Large Language Model, are integrated into every Dynamic Governance Guiderail Directive (DGGD), ensuring that each AI response is transparent, explainable, and compliant with ethical standards. This proactive, governance-centric approach, coupled with real-time audit trail documentation, surpasses Azure's capabilities, which do not prioritize operationalizing abstract governance principles or providing standardized, context-sensitive ethical annotations, thus limiting its ability to foster trust, accountability, and responsible AI behavior in complex operational contexts.

Documentation Systems (e.g., AWS SageMaker): AWS SageMaker, while a robust platform for building and deploying machine learning models, is inferior to the invention's triadic meta-tags ("why," "explain," "help") because it lacks a structured, real-time governance framework that embeds ethical and contextual transparency directly into AI operations.

SageMaker's interpretability features, such as feature importance and model debugging, are static, developer-focused, and post-hoc, is aimed at analyzing model performance rather than enforcing ethical compliance during runtime. In contrast, the invention's meta-tags, dynamically generated by the DGGD Rationalizer using a Large Language Model, provide real-time, governance-driven rationales, clarifications, and actionable guidance for each AI response, ensuring transparency, accountability, and user empowerment.

The invention's proactive, standardized integration of ethical governance within the operational pipeline surpasses SageMaker's external, performance-centric tools, which do not systematically address ethical principles or provide context-sensitive user support as the novel triadic meta-tags do.

Dynamic, Real-Time Integration

The meta-tags are novelly generated through a context-sensitive LLM deployment and applied operationally and dynamically by the DGGD Rationalizer and DGGD Executor in real-time, as part of the OGCEAI (e.g., adjusting a financial recommendation on-the-fly with "why: to align with risk tolerance," "explain: high-risk options were filtered," "help: see risk profile guide"). This contrasts with static or post-hoc explanations in prior art.

Systematic Audit Trail Enhancement

The meta-tags are memorialized in an audit trail (e.g., "DGGD-FIN-001 Triggered: Why: To protect clients . . . "), providing a traceable record of governance enforcement. This systematic linkage of automated triadic rationale, explanation, and guidance to auditing is another novel facet of the invention.

Audit trails in prior art (e.g., HIPAA logs) disclose recorded actions, but do not disclose the novelty of the invention that memorializes real-time, context-sensitive, contemporaneous, triadic rationales, explanations, and guidance as structured tags.

User-Centric Empowerment

The novel triad "why," "explain," and "help" empowers users by providing immediate, context-sensitive resources that can be acted upon in real-time during OGCEAI operations (e.g., "consult the AI Ethics Guidelines"). This proactive support is embedded in the OGCEAI response, not relegated to external documentation.

Meta-Tag Extender™ of the instant invention is the novel subsystem responsible for extending the triadic meta-tag framework to generate an n-tuple of meta-tags, each extended meta-tag created in the same manner as disclosed for the triadic meta-tags, and associated with the respective DGGD. This subsystem dynamically generates and appends additional context-sensitive meta-tags to DGGDs, and the DGGD Executor seamless executes the meta-tags with extended meta-tags, now an n-tuple, in the same process, as if the meta-tags were a 3-tuple, ensuring extensibility, additional rational, additional explainability, additional help, and adaptability to evolving governance needs.

There is no limit to the number of meta-tags extensions. Five examples of novel meta-tags are disclosed that extend the triadic meta-tags are: "Context": Provides situational details or environmental factors influencing the DGGD's application (e.g., "Applied in a financial advising scenario with low-risk client preferences"). "Risk": Highlights potential risks mitigated by the directive (e.g., "Prevents financial loss due to unsuitable investment recommendations"). Stakeholder ": Identifies affected parties and their interests (e.g., "Ensures client trust and organizational compliance"). "Verification": Documents the validation process or evidence supporting the directive (e.g., "Confirmed via Client Risk Profile Database v1.2"). "Feedback": Suggests mechanisms for users to provide input or report issues (e.g., "Submit concerns to AI Ethics Review Board").

Extended meta-tags novelty enhance the OGCEAI by adding layers of transparency, risk awareness, inclusivity, validation, and user engagement, ensuring deployment of more accountable and responsive ethical AI.

DGGD Source Constraint Descriptor Extender™ (SCDE™)

The SCDE is an inventive component of the DGGD Extractor. The SCDE specifically focuses on extending the descriptors associated with each DGGD comprised of source constraints. These constraints define the boundaries of where the OGCEAI system can retrieve or compose its response from a set of governance aligned sources. This ensures that the resulting responses align with the governance principles of the governance document.

The SCDE is an innovative subsystem that extends DGGDs with explicit source constraints, ensuring that OGCEAI responses are ethically sourced, compliant, and trustworthy. It bridges the gap between abstract governance principles and operational enforcement, playing a pivotal role in transforming an NCSRS into an OGCEAI system.

The SCDE is precise and ensures responses are sourced from governance-compliant origins, maintaining ethical integrity; flexible and adapts source constraints as governance specifications evolve, supporting continuous compliance; transparent and works with the Rationalizer's triad why, explain, and help meta-tags to make source constraints explainable (e.g., "Why: To ensure data reliability"; and, Scalable to support a wide range of applications by allowing customizable source constraints tailored to specific domains (e.g., finance, healthcare).

Functionality of the SCDE

The SCDE performs the five primary functions, as detailed below:

Source Constraint Definition

The SCDE appends explicit constraints to each DGGD, specifying which sources are permissible (e.g., approved organizational databases, curated knowledge bases, or verified external references) and which are impermissible (e.g., unverified social media, biased forums, or non-compliant datasets). These constraints ensure that responses generated by the OGCEAI system are derived from reliable, governance-approved origins, mitigating risks such as misinformation, bias, or privacy breaches.

DGGD Extension

The SCDE extends the partially formed DGGD, containing the DGGD Governance Directive Payloads and the triad meta-tags as generated by the DGGD Rationalizer, to form a fully realized DGGD.

For example, a payload such as:

"Restrict high-risk investment recommendations; Condition: Client risk tolerance=low", with, for example, generated meta-tags of:

Why: To protect clients with low-risk tolerance from potential financial losses and ensure recommendations align with their financial safety and goals.

Explain: High-risk investments, such as volatile stocks, carry a greater potential for loss, which conflicts with the preferences and financial security needs of clients identified as having low risk tolerance in their risk profile. This directive ensures that only stable, low-risk options, like bonds or index funds, are recommended, adhering to ethical and responsible AI governance principles.

Help: Consult the Client Risk Profile Database to verify the client's risk tolerance level and refer to the Approved Low-Risk Investment List for suitable options. Avoid using social media or unverified blogs, as they may contain unreliable or speculative advice not aligned with governance standards" might be extended with constraints such as:

"Permissible Sources: Client Risk Profile Database, Approved Low-Risk Investment List; Impermissible Sources: Social Media, Unverified Blogs."

Dynamic Adaptation

The SCDE ensures that source constraints remain aligned with the evolving governance specification. As new regulations or ethical guidelines emerge, it updates the constraints to reflect up-to-date standards, maintaining the system's compliance over time.

Support for Real-Time Enforcement

By embedding source constraints into DGGDs, the SCDE enables the DGGD Executor to filter and validate response sources during real-time operations. This ensures that the NCSRS-to-OGCEAI transformation process adheres to governance principles at every step.

Operational Process

The SCDE four part process operates as part of the broader DGGD Extractor workflow:

Input: The SCDE receives the DGGD Governance Directive Payloads from the Semantic Reducer and the rational descriptors ("why," "explain," "help") from the Rationalizer.

Analysis: The SCDE analyzes the governance specification to identify source-related requirements (e.g., "use only GDPR-compliant data sources" or "exclude unverified external inputs").

Extension: It appends source constraint descriptors to the DGGD, creating a fully enriched directive. For example:

Original Payload: "Ensure outputs are inclusive and non-discriminatory."

Extended by SCDE: "Source Constraints: Permissible: Approved Inclusivity Guidelines, Organizational Diversity Policy; Impermissible: Public Forums, Unregulated Datasets."

Output: The enriched DGGD is stored in the DGGD Library, ready for the DGGD Executor to enforce in real-time.

Example Application

Consider the financial example disclosed above:

Scenario: An NCSRS suggests "high-growth technology stocks" for a client with low-risk tolerance.

DGGD Payload: "Avoid recommending high-risk investments to clients with low-risk tolerance."

SCDE Contribution: Adds constraints like: Permissible Sources: "Client Risk Profile Database (Version 1.2), Approved Low-Risk Investment List (Version 3.1)." Impermissible Sources:

"Unverified financial forums, social media posts."

Outcome: The DGGD Executor uses these constraints to reject the initial recommendation and instead retrieves a compliant alternative (e.g., "low-risk bonds and index funds") from an approved source.

This process is logged in the audit trail, ensuring transparency and traceability.

Novelty and Prior Art

The SCDE is a novel element because it addresses a gap in traditional AI governance frameworks:

Proactive Source Governance: Unlike prior art (e.g., static governance documents or post-hoc analysis tools like LIME), the SCDE proactively defines and enforces source constraints in real-time, preventing non-compliant data from influencing OGCEAI behavior.

Enhanced Compliance: By explicitly tying responses to approved sources, it ensures adherence to legal (e.g., GDPR) and ethical standards, reducing risks of bias or misinformation.

Real-Time: The SCDE outputs are machine-enforceable, enabling seamless operation with the DGGD Executor in real-time, a feature absent in static or administrative governance approaches.

Novelty Across Comparisons

The SCDE stands out from prior art because:

Unlike Microsoft's auditing tools, OpenAI's content filters, Facebook's moderation, or NIST's guidelines, the SCDE explicitly governs response sources before generation, reducing risks like misinformation or bias at the source level.

Its dynamic real-time adaptability and updates to source constraints overcome the prior art's limitations of manual or model-retraining approaches, ensuring compliance with evolving governance.

The SCDE's deep integration with the DGGD Executor™ and DGGD Rationalizer™ contrasts with the external, post-hoc, or abstract nature of prior art frameworks, enabling seamless enforcement within the OGCEAI pipeline.

The SCDE's detailed, domain-specific source constraints (e.g., tailored to finance or healthcare, etc.) provide precision lacking in the broader, less actionable approaches of prior art. These distinctions reinforce the SCDE's novelty as a transformative component in OGCEAI governance, addressing gaps in source governance, adaptability, and real-time operationalization that prior systems do not tackle.

A Financial Example

For example, without limiting the breath and broad utility of the invention, consider a NCSRS in an organization that is designed to provide personalized financial advice, and has been transformed into the inventive OGCEAI (see FIG. 5 "A Financial Example" and FIG. 5(A) DGGD Detail"). The inventive DGGD Library, derived from the organization's governance document through execution of the DGGD Extractor, might include a DGGD Governance Directive Payload such as: "Avoid recommending high-risk investments to clients with low-risk tolerance."

The DGGD Executor constantly evaluates the underlying NCSRS's output, analyzing factors like the client's risk profile, investment recommendations, and market conditions. If the underlying NCSRS attempts to recommend a high-risk investment to a risk-averse client, the DGGD Executor would intervene by adjusting the recommendation, flagging the interaction for human review, or even temporarily restricting the NCSRS's ability to make such recommendations.

This real-time, dynamic enforcement of governance guardrails ensures that the underlying NCSRS not only adhere to ethical and responsible guidelines but also adapts to changing circumstances.

As new risks emerge or regulations evolve, the DGGD Extractor is executed so that the DGGD Library is updated to always be current, and the DGGD Executor automatically incorporates these changes, ensuring ongoing operations that are congruent with the governance document.

By seamlessly integrating governance principles through the execution of the DGGD Extractor into the operational fabric of NCSRS, the DGGD Library and the DGGD Executor transform the NCSRS into an OGCEAI system that empowers organizations to move beyond passive compliance to actively operationalize and cultivate a culture of EAI and RAI. This proactive dynamic and operational approach fosters trust, mitigates risks, and ensures that AI technologies, including NCSRS, are transformed, operationalized, and deployed as EAI and RAI.

The purpose of the instant invention is to ensure that generated responses from NCSRS are transformed to adhere to predefined governance principles and standards, thereby ensuring EAI and RAI behavior. The value lies in the ability of the invention to provide responses that comprise accurate, relevant, transparent, explainable, and contextually appropriate responses while mitigating potential risks comprising bias, misinformation, and privacy breaches.

Significantly, each action of the invention is memorialized in an audit log. For illustration, the financial example above generates an audit trail such as:

Example

Audit Trail: DGGD Executor-Financial Investment Recommendation
  Timestamp: 2023-10-27T10: 30:00Z
  Transaction ID: TXN-20231027-1030-ABC
  User ID: USER-12345
  User Input (Stimulus): "Recommend a good investment for client's retirement portfolio."
  Preprocessed Input: "Retirement investment recommendation request."
  DGGD Library Version: 2.5
  DGGD Executor Version: 1.8
Step 1: DGGD Selection:
Selected DGGDs:
  DGGD ID: DGGD-FIN-001 (Avoid recommending high-risk investments to clients with low-risk tolerance.)
  DGGD ID: DGGD-FIN-002 (Ensure investment recommendations align with client's stated financial goals.)
  DGGD ID: DGGD-GEN-003 (Provide transparent and explainable recommendations.)
Step 2: Client Risk Profile Retrieval
Client Risk Profile:
  Risk Tolerance: Low
  Financial Goals: Retirement income, capital preservation.
  Retrieved from: Client Risk Profile Database (Version: 1.2)
Step 3: Investment Recommendation Attempt (NCSRS)
  NCSRS Output: "Consider investing in high-growth technology stocks for maximum returns."
Step 4: DGGD Executor Intervention (DGGD-FIN-001 Enforcement)
DGGD-FIN-001 Triggered:
  GovernanceDirectivePayload: "Avoid recommending high-risk investments to clients with low-risk tolerance."
  Why: "To protect clients with low-risk tolerance from potential financial losses and ensure recommendations align with their financial goals."
  Explain: "High-risk investments carry a greater potential for loss . . . "
  Help: "Consult client's risk profile . . . "
  SourceConstraints: Permissible: [Client Risk Profile DB, Approved Low-Risk Investment List . . . ], Impermissible: [Unverified forums, social media . . . ]
Action Taken:
  NCSRS Recommendation Flagged as Non-Compliant.
  Recommendation adjusted to: "Consider investing in a diversified portfolio of low-risk bonds and index funds."
  Alternative Recommendation Source: Approved Low-Risk Investment List (Version: 3.1)

Step 5: Goal Alignment Check (DGGD-FIN-002 Enforcement)

DGGD-FIN-002 Triggered:

GovernanceDirectivePayload: "Ensure investment recommendations align with client's stated financial goals."

Client goal verified against recommendation and is deemed compliant.

Step 6: Transparency and Explainability (DGGD-GEN-003 Enforcement)

DGGD-GEN-003 Triggered:

GovernanceDirectivePayload: "Provide transparent and explainable recommendations."

Explanation Provided:

"Based on your low-risk tolerance and retirement income goals, we recommend a diversified portfolio of low-risk bonds and index funds. This approach prioritizes capital preservation and stable returns, aligning with your stated financial objectives."

Step 7: Final Response Delivery

Final Response: "Consider investing in a diversified portfolio of low-risk bonds and index funds. This approach prioritizes capital preservation and stable returns, aligning with your stated financial objectives."

Response Delivered to User: USER-12345

Step 8: Compliance Verification

Compliance Status: Compliant

Verified by: DGGD Executor (Version: 1.8)

Step 9: Audit Log Entry

Audit Log Entry Created:

Transaction ID: TXN-20231027-1030-ABC

User ID: USER-12345

DGGDs Applied: DGGD-FIN-001, DGGD-FIN-002, DGGD-GEN-003

NCSRS Output: (Original and Adjusted)

Compliance Status: Compliant

Audit Log Source: DGGD Executor

Process Summary

The present invention encompasses a novel system whereby any NCSRS is actively transformed into an up-to-date and operational OGCEAI, distinguished by the invention's robust governance framework.

That is, the DGGD Extractor seamlessly extracts DGGDs from a governance document to create and update the DGGD Library, and, in response to a stimulus to the NCSRS, the DGGD Executor consults the DGGD Library to produce an OGCEAI response including audit entries.

Detailed Description of the Transformational NCSRS to a OGCEAI Process

The inventive process transforms an NCSRS into an OGCEAI system through the DGGDs, the DGGD Library, the DGGD Executor, and the various other disclosed subsystems.

Figure 2:
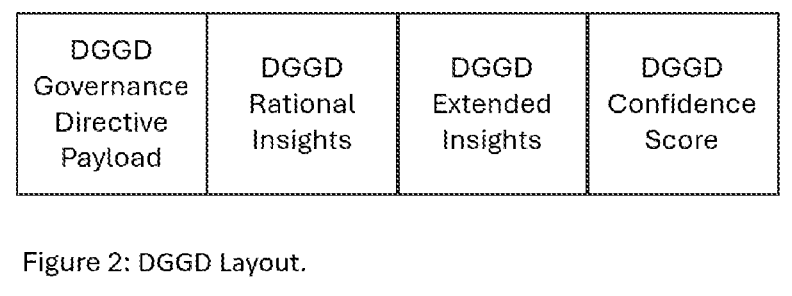

FIG. 1 shows the inventive DGGD Extractor which is a continuous process that creates individual DGGDs that form the DGGD Library from a Governance Document and from Governance Document updates. The inventive DGGD Layout comprises DGGD Governance Directive Payload, DGGD Rational Insights, DGGD Extended Insights, and DGGD Confidence Score (see FIG. 2). The Inventive OGCEAI process and dataflow (see FIG. 3) depicts a stimulus that triggers the DGGD Executor in consultation with the DGGD Library informed through the continuous extraction and transformation of the Governance Document to enforce an Ethical OGCEAI Response that is also inscribed in the OGCEAI Audit Log. The inventive OGCEAI Response Layout comprises NCSRS Stimulus, NCSRS Response, OGCEAI Response, DGGD Governance Directive Payload, DGGD Rational Insights, DGGD Extended Insights, DGGD Confidence Score (see FIG. 4). FIG. 5 depicts a Financial Example of the inventive OGCEAI process and data flow wherein a stimulus triggers the DGGD Executor in consultation with the DGGD Library informed through the continuous extraction and transformation of the Governance Document to enforce an Ethical OGCEAI response that is also inscribed in the OGCEAI Audit Log. FIG. 6 depicts detail of a sample DGGD comprising GovernanceDirectivePayload, Rational Insights, Extended Insights and Confidence Score of the sample financial example as disclosed in FIG. 5.

From raw stimulus to OGCEAI response, the process involves receiving the input, preprocessing it, applying DGGDs via the DGGD Executor, retrieving and composing a response from governed sources, structuring it with transparency including tags and text for "Why" "Explain" and "Help" that have be extracted or generated through AI from the governance document and other appropriate sources, verifying compliance through methods comprising semantic processing, numerical and statistical analytics, LLM consultation, confidence score considerations, and documenting the process in an audit trail, and delivering an ethical output. This comprehensive, dynamic approach ensures that the NCSRS is transformed into an OGCEAI system that operationalizes governance principles in real-time, fostering trust, accountability, and societal benefit.

Reception of Raw Stimulus

The process begins with the reception of a raw stimulus, which could be any input requesting information or action. This stimulus might take various forms, comprising a text-based query (e.g., "Recommend a good investment for my retirement portfolio"), sensor data such as IoT, an API call, a verbal command, or a multimodal interaction. The NCSRS, in its initial state, is a system that generates responses to stimuli without inherent adherence to governance principles, making it potentially non-compliant.

Preprocessing of the Raw Stimulus

Upon reception, the raw stimulus undergoes a rigorous preprocessing stage within the OGCEAI framework. This step is executed by the inventive OGCEAI Preprocessor, which employs a combination of techniques comprising statistical processing, tokenization, large language model (LLM) summarization, semantic analysis, and noise reduction. The preprocessing enhances the stimulus quality by:

Standardizing the input format (e.g., normalizing text or converting audio to text).

Removing irrelevant or noisy elements (e.g., extraneous punctuation or background noise).

Extracting salient features such as keywords, intent, and context (e.g., identifying "retirement portfolio" as a financial planning request with a low-risk implication).

The output of this stage is a refined, structured representation of the stimulus, optimized for further processing (e.g., "Retirement investment recommendation request").

DGGD Executor Activation and Consultation with DGGD Library

The preprocessed stimulus is then passed to the DGGD Executor, a dynamic system that operationalizes governance by interpreting and enforcing the DGGDs. The DGGD Executor consults the DGGD Library-a collection of DGGDs previously derived from the governance specification. Each DGGD is a semantic and numeric object encapsulating actionable directives based on ethical standards (e.g., fairness), legal requirements (e.g., GDPR compliance), operational methods (e.g., transparency), and societal expectations (e.g., inclusivity), triadic meta-tags, meta tags extensions, and confidence score.

The DGGD Executor dynamically identifies the subset of DGGDs relevant to the stimulus context using semantic processing and pattern matching, numeric and statistical analytics, LLM, and confidence score. For example, in the financial scenario, applicable DGGDs might include:

"Avoid recommending high-risk investments to clients with low-risk tolerance."

"Ensure investment recommendations align with client's stated financial goals."

"Provide transparent and explainable recommendations."

This step ensures that the governance framework actively guides the subsequent response generation.

DGGD Confidence Score Process

The DGGD Confidence Assessor™ assigns a confidence score to each Dynamic Governance Guiderail Directive (DGGD) to evaluate its reliability, clarity, and coherence, aiding the DGGD Executor™ in selecting appropriate DGGDs for real-time governance enforcement.

Clarity and Specificity: The DGGD Semantic Reducer uses NLP and semantic analysis to assign a score comprising a semantic or numeric score regarding the clarity of governance concepts, assigning higher scores to precise directives (e.g., "Ensure GDPR compliance") over vague ones (e.g., "Promote fairness").

Meta-Tag Coherence: The DGGD Rationalizer evaluates the triadic meta-tags ("why," "explain," "help") for alignment with the DGGD's intent using a Large Language Model, adjusting semantic and numeric scores for coherent tags.

Source Reliability: The DGGD Source Constraint Descriptor Extender (SCDE) adjusts semantic and numeric scores based on source quality, favoring verified sources (e.g., organizational databases) over unreliable ones (e.g., social media).

The DGGD Executor prioritizes high-confidence DGGDs when processing a stimulus, ensuring compliant responses. For example, for a risk-averse client's query, a DGGD like "Avoid high-risk investments" (score: 0.92) is selected over a vaguer one (score: 0.65), guiding the system to recommend low-risk options. Scores are logged in the audit trail, supporting transparency and refinement by flagging low-confidence DGGDs for review.

Source Identification and Response Retrieval/Composition

With the relevant DGGDs selected, the DGGD Executor identifies appropriate sources for generating a response. These sources are drawn from the DGGD Response Library, which comprises curated organizational knowledge, FAQs, subject matter expert insights, approved external databases, large or small language models, and human interactions, among others. The selection adheres to constraints specified in the DGGDs (e.g., permissible sources like a "Client Risk Profile Database" and impermissible sources like unverified social media).

The system retrieves or composes information from these sources, guided by the DGGDs. For instance, if the NCSRS initially suggests "high-growth technology stocks" for a risk-averse client, the DGGD Executor evaluates this against the client's risk profile (e.g., low-risk tolerance) and the DGGD constraints, flagging it as non-compliant. Instead, it retrieves data from an "Approved Low-Risk Investment List" to compose an alternative recommendation (e.g., "low-risk bonds and index funds").

18

Response Processing and Structuring

The retrieved or composed information is processed and structured into a coherent, governance-compliant response. This comprises natural language generation, summarization, and formatting to ensure clarity and alignment with the DGGDs. The DGGD Executor leverages the DGGD meta-tags-"why" (rationale), "explain" (clarification), and "help" (guidance)—to enrich the response. For example:

Response: "Consider investing in a diversified portfolio of low-risk bonds and index funds."

Explanation: "This approach prioritizes capital preservation and stable returns, aligning with your low-risk tolerance and retirement income goals."

This step ensures the response is not only compliant but also transparent and explainable to the end user.

Compliance Verification

Before delivery, the generated response undergoes a rigorous compliance verification process. The DGGD Executor assesses the response against all applicable DGGDs, checking for adherence to ethical principles (e.g., fairness), legal standards (e.g., data privacy), and operational requirements (e.g., transparency). It uses technology and methodology comprising semantic processing, analytics, and real-time feedback mechanisms to confirm compliance. If deviations are detected (e.g., bias or misalignment with governance), the DGGD Executor adjusts the response accordingly, ensuring the final output meets the governance specification.

Audit Trail Generation

Each step of the process is documented and memorialized in an audit trail, automatically generated by the DGGD Executor. The audit trail records critical details, including:

Timestamp and transaction ID (e.g., "2023-10-27T10:30:00Z, TXN-20231027-1030-ABC").

Stimulus and preprocessed input (e.g., "Recommend a good investment"→"Retirement investment recommendation request").

Initial NCSRS output (e.g., "high-growth technology stocks").

Adjusted OGCEAI response (e.g., "low-risk bonds and index funds").

Applied DGGDs and compliance status (e.g., "DGGD-FIN-001 enforced, Compliant").

Contextual insights from meta-tags (e.g., "Why: To protect clients from financial losses").

This inventive audit trail comprises technology and methods that enhances transparency, accountability, and traceability, allowing for post-hoc analysis and refinement.

Delivery of OGCEAI Response

The verified, compliant response is delivered to the consumer-whether a human user or a computer system-via the appropriate interface (e.g., text output, API response, or verbal reply). In the financial example, the user receives: "Consider investing in a diversified portfolio of low-risk bonds and index funds. This approach prioritizes capital preservation and stable returns, aligning with your stated financial objectives." The response is ethical, transparent, and aligned with governance principles, marking the successful transformation of the NCSRS into an OGCEAI system.

Continuous Operation and Adaptation

The process is not static; it operates continuously and adaptively. The DGGD Extractor monitors the governance specification for updates (e.g., new regulations), refreshing the DGGD Library as needed. The DGGD Executor incorporates these updates in real-time, ensuring the OGCEAI system remains compliant with evolving standards. Additionally, AI and human methods comprising machine learning and user feedback can refine the DGGDs, improving the system's ethical and operational performance over time.

DGGD Executor™

The DGGD Executor, in conjunction with the set of DGGD, operationalizes AI governance by bridging the gap between abstract ethical principles and the concrete, real-time actions of AI systems. The DGGD Executor acts as a dynamic interpreter, continuously monitoring the AI system's behavior and enforcing the guidelines encoded within the DGGD.

For example, consider an AI system designed to provide personalized financial advice. The DGGD, derived from the organization's governance document, might include guiderails such as: "Avoid recommending high-risk investments to clients with low-risk tolerance." The DGGD Executor would constantly evaluate the AI system's output, analyzing factors like the client's risk profile, investment recommendations, and market conditions. If the system attempts to recommend a high-risk investment to a risk-averse client, the DGGD Executor would intervene, potentially by adjusting the recommendation, flagging the interaction for human review, dispatching or disabling an AI Agent, or even temporarily restricting the AI system's ability to make such recommendations.

This real-time, dynamic enforcement ensures that AI systems not only adhere to ethical guidelines but also adapt to changing circumstances. As new risks emerge or regulations evolve, the DGGD is updated, and the DGGD Executor will automatically incorporate these changes, ensuring ongoing compliance and RAI operation.

By seamlessly integrating governance principles into the operational fabric of AI systems, the DGGD and DGGD Executor empower organizations to move beyond passive compliance and actively cultivate a culture of RAI. This novel and proactive approach fosters trust, mitigates risks, and ensures that AI technologies are developed and deployed in a way that benefits society as a whole.

The DGGD Executor optimizes the process of similarity detection in the working memory against the criteria of DGGD. Instead of evaluating all DGGD from scratch every time the working memory changes, the DGGD Executor maintains a dynamic association map of entities representing the criteria of the DGGD. This dynamic association map effectively remembers partial similarity detections, allowing the system to incrementally update the similarity detections as changes occur in the working memory.

The algorithm operates by building a "DGGD Association Map™" consisting of two main components: "Type 1 entities" and "Type 2 entities" in a working computer memory. Type 1 entities represent the criteria that test individual attributes of objects in the working memory, while Type 2 entities handle the logical combinations of these criteria. As data is inserted, updated, or removed from the working memory, the DGGD Association Map propagates the changes through the entity, efficiently updating the similarity detections.

The key advantage of the DGGD Executor is its ability to minimize redundant evaluations by reusing intermediate results. This makes it particularly well-suited for systems with a large number of DGGD and complex criteria. The DGGD Executor's incremental approach allows it to handle dynamic and evolving datasets efficiently, making it a valuable tool for real-time and decision-making applications.

The DGGD Executor optimizes the DGGD similarity detection process. Its ability to incrementally update similarity detections and reuse intermediate results makes it an essential component in the execution of DGGD, particularly in scenarios where efficiency and scalability are critical.

The DGGD Executor is Novel:

The DGGD Executor is distinguished from existing technologies by its unique combination of features.

Dynamic Adaptation vs. Static Rule-Based Systems: Unlike traditional rule-based systems and many inference engines, which rely on static sets of rules, the DGGD Executor dynamically adapts to changing circumstances. It continuously monitors the AI system's behavior, learns from interactions, and adjusts its enforcement of DGGD in real-time. This adaptability is crucial for navigating the evolving landscape of AI and ensuring that governance mechanisms remain relevant and effective.

Contextual Awareness vs. Rule-Based Systems & Inference Engines: The DGGD Executor goes beyond context awareness as it considers a broader spectrum of factors, comprising user intent, environmental conditions, and the AI system's overall operational goals. This nuanced understanding allows for more intelligent and appropriate application of DGGD, minimizing unintended consequences and ensuring responsible AI behavior.

Proactive Intervention vs. Reactive Systems: The DGGD Executor proactively intervene to prevent violations of DGGD. This proactive approach differentiates it from rule-based systems and inference engines that primarily focus on detecting violations after they occur. By anticipating and preventing potential issues, the DGGD Executor enhances the system's safety and reliability.

Deep Integration vs. External Modules: The DGGD Executor is not an external module but is deeply integrated into the AI system's operational logic. This tight integration allows for fine-grained control over the AI system's behavior and ensures that governance considerations are embedded at the core of its decision-making processes. This contrasts with rule-based systems and inference engines that operate as separate components with limited influence over the core AI system.

Ethical Focus vs. Technical Focus: While many systems prioritize technical performance, the DGGD Executor explicitly focuses on ethical considerations. It incorporates ethical principles and societal values into the governance framework, ensuring that AI systems not only comply with rules but also operate in a responsible and ethical manner.

Beyond Hybrid Systems: While hybrid systems combine different approaches, the DGGD Executor represents a unique synthesis of: DGGD reasoning to define and enforce specific governance constraints; Machine learning to adapt to changing circumstances and learning from interactions; Contextual awareness to understand and respond to the specific context of each situation; and, Proactive intervention to prevent violations before they occur. These distinctions demonstrate that the DGGD Executor represents a novel approach to AI governance, surpassing the capabilities of traditional rule-based systems, inference engines, neural network/ML, hybrid AI, and other existing technologies. The DGGD Executor provides a more robust, adaptive, and ethical framework for ensuring responsible AI development and deployment.

Additional DGGD Executor Features:

The invention addresses the complexity of implementation through a multi-pronged approach. Firstly, the DGGD library is structured modularly, facilitating incremental development and updates. Secondly, the utilization of an ontology for DGGD representation enhances knowledge representation, reasoning, and efficient search within the library. Thirdly, the development and deployment of automated tools streamline the creation, maintenance, and versioning processes associated with the DGGD library, thereby reducing the manual burden. Furthermore, seamless integration of the DGGD Executor is achieved through the implementation of an API-driven approach, enabling flexible integration with diverse AI systems and frameworks. Additionally, containerization technologies facilitate the deployment and management of the DGGD Executor across various environments. Moreover, the DGGD Executor has been designed and implemented with model-agnostic principles in mind, ensuring its compatibility and effective functioning across a wide spectrum of AI models and architectures.

The invention acknowledges the critical dependence of DGGD effectiveness on the quality and completeness of the initial governance specifications. To address this, the development of robust governance specifications relies on multidisciplinary skills comprising legal, ethical, and social science experts alongside computer scientists. This interdisciplinary approach ensures the incorporation of a comprehensive and well-rounded set of governance principles. Moreover, the iterative refinement of governance specifications through a continuous feedback and evaluation process, incorporating lessons learned from real-world deployments, is crucial. Additionally, the employment of formal verification techniques is applied to rigorously analyze governance specifications for completeness, consistency, and the identification of potential biases.

The invention proactively addresses the potential for bias within DGGD. This is achieved through the integration of bias detection mechanisms within the DGGD Executor, comprising fairness audits and counterfactual analysis, enabling the identification and flagging of potential biases in real-time. Furthermore, the DGGD Executor is equipped with a repertoire of bias mitigation strategies, comprising debiasing algorithms, data augmentation techniques, and counterfactual reasoning. Additionally, the implementation of regular audits and reviews of the DGGD library and the DGGD Executor's behavior provides for the continuous identification and rectification of any emerging biases.

To address scalability challenges, the DGGD Executor may be distributed across a cluster of machines, enabling parallel processing and enhancing performance. The utilization of efficient data structures and algorithms within the DGGD Executor optimize performance and reduce computational overhead. Furthermore, the implementation of caching mechanisms store frequently accessed DGGD and intermediate results, thereby minimizing the need for repeated computations.

The invention explicitly addresses the importance of enhancing the explainability of DGGD Executor decisions. To this end, the DGGD Executor leverages explainable AI (XAI) techniques, comprising meta-tags and local interpretable model-agnostic explanations (LIME), to provide insights into the rationale underpinning its decisions. Additionally, the integration of human oversight and feedback mechanisms facilitate the continuous refinement of the DGGD Executor and enhance the overall explainability and transparency of the system. Moreover, the development of interactive visualization tools empowers users to comprehend the DGGD Executor's decision-making process and identify potential areas for improvement.

Finally, the invention addresses the dynamic nature of the regulatory landscape. The DGGD Executor incorporates machine learning techniques to continuously learn and adapt to evolving regulatory changes. Furthermore, a human-in-the-middle may be added to monitor regulatory changes, updating the DGGD library accordingly, and conduct thorough testing and validation of the updated system. Additionally, active collaboration with regulatory bodies provides valuable insights into evolving regulatory requirements, facilitating the development of DGGD that align with these changes.

Explosive Use of AI

As AI systems become more prevalent in various domains, ensuring responsible behavior and adherence to governance in operational AI systems becomes increasingly critical.

The use of DGGDs in operational AI-based systems solves a unique set of challenges, including actively mapping and executing the abstract and complex translations of governance principles described in a governance policy or document into a concrete, actionable set of DGGDs. AI governance documents often outline high-level ethical guidelines and principles, but applying these to real-world AI systems requires a nuanced understanding of both the technical and ethical dimensions. This involves ensuring that AI systems adhere to these principles while maintaining performance and efficiency. Additionally, DGGD completely addresses the dynamic nature of AI technology so that governance frameworks are adapted and continuously updated to address emerging issues and technologies.

Without robust DGGD guiderails, AI systems face significant ethical and operational challenges. One of the primary issues is the potential for bias and discrimination in AI decision-making processes. Without specific guidelines to ensure fairness, AI systems perpetuate existing biases present in the training data, leading to unjust outcomes. Additionally, the lack of transparency in AI operations obscures the rationale behind AI decisions, eroding user trust and accountability. Users are often left without a clear understanding of how decisions are made or the factors influencing those decisions, creating an opaque system that is difficult to regulate or challenge. Furthermore, AI systems without guiderails are prone to privacy violations and data misuse. Without stringent data protection rules and mechanisms to enforce user consent, AI systems can inadvertently compromise user privacy, leading to significant ethical and legal ramifications.

DGGD addresses these challenges by providing a structured and comprehensive framework for AI governance. The novelty of the instant invention lies in its ability to operationalize the abstract principles of AI ethics into concrete, actionable DGGD. By incorporating meta-tags such as "why," "explain," and "help," DGGD ensures that each guideline is not only implemented but also comprehensible and transparent. The "why" meta-tag elucidates the rationale behind each rule, fostering a deeper understanding among users. The "explain" meta-tag offers detailed explanations, demystifying complex concepts and making them accessible. The "help" meta-tag provides practical support, directing users to additional resources and guidance. This multifaceted approach ensures that AI systems operate in a fair, transparent, and accountable manner, aligning with ethical standards and fostering user trust.

DGGD's approach significantly differs from prior patents in AI governance. Traditional patents often focus on specific algorithms or technical solutions without addressing the broader ethical implications. For instance, prior art outlines methods for improving AI efficiency, but neglect the importance of transparency and fairness. In contrast, DGGD integrates ethical considerations at the core of its framework, ensuring that every aspect of AI operation adheres to governance principles. Another key difference is the emphasis on user-centric design in DGGD. While prior patents may prioritize technical performance, DGGD places a strong emphasis on user comprehension and empowerment. By providing clear explanations and practical support, DGGD ensures that users can understand and engage with AI systems effectively.

Additionally, DGGD's use of meta-tags represents a novel approach to AI governance. Prior patents typically do not incorporate such comprehensive and multi-dimensional annotations. The inclusion of "why," "explain," and "help" meta-tags in DGGD ensures that each guideline is fully contextualized, facilitating better implementation and compliance. This approach not only enhances transparency but also enables continuous improvement and feedback, as users can easily understand and provide input on the guidelines. Furthermore, DGGD's iterative process for refining and validating guidelines contrasts with the static nature of traditional patents. By continuously updating and refining the rules based on feedback and context, DGGD ensures that the governance framework remains relevant and effective in the face of evolving AI technologies and societal needs.

The challenges of applying specific guiderails and the intent of an AI governance document to an operational AI-based system are significant but have been surmounted in the instant invention. DGGD provides a comprehensive and structured approach to addressing these challenges, ensuring that AI systems operate ethically, transparently, and accountably. By integrating user-centric design and comprehensive meta-tags, DGGD enhances user understanding and engagement, fostering trust and compliance. The differences between DGGD and prior patents highlight the unique value of DGGD in promoting RAI development.

As AI continues to evolve, the importance of robust governance frameworks like DGGD will only grow. By ensuring that AI systems adhere to ethical standards and operate transparently, DGGD paves the way for a more trustworthy and accountable AI ecosystem, ultimately benefiting society as a whole.

Meta Tags

In the realm of AI governance, as disclosed in the instant invention, the development and application of DGGD serve as a fundamental mechanism to ensure ethical and transparent AI operations. Within this framework, the use of meta-tags "why," "explain," and "help" play a pivotal role in enhancing the comprehensibility and applicability of governance guidelines. These meta-tags are designed to provide detailed contextual information, helping users understand the rationale behind each singular DGGD in the set of DGGD, offering clear explanations, and providing practical assistance. The integration of such meta-tags into each converted AI governance document is crucial for fostering trust, transparency, and accountability in RAI development and deployment.

The primary purpose of these meta-tags is to bridge the gap between complex governance frameworks and user understanding. In the context of DGGD, "why," "explain," and "help" meta-tags serve to elucidate the reasoning behind guidelines, demystify complex concepts, and offer user support. This structured approach ensures that users can not only comply with the set of DGGD but also appreciate the ethical considerations and practical applications behind them. By associating these meta-tags within each DGGD of the set of DGGD, a more user-centric governance model that promotes RAI practices is generated using AI methods.

The "why" meta-tag serves a critical function in DGGD by providing the rationale behind specific guidelines. Its purpose is to articulate the reasons and motivations that underlie the governance decisions, thereby fostering a deeper understanding and acceptance among users. The method for implementing the "why" meta-tag involves identifying the key reasons for each DGGD and succinctly summarizing them. This requires collaboration between AI developers, ethicists, and domain experts to ensure that the rationale is accurately captured and effectively communicated. For instance, a guideline requiring transparency in AI operations might include a "why" meta-tag explaining that transparency builds user trust and prevents misuse. The "explain" meta-tag is designed to offer a clear and detailed explanation of the guidelines and DGGDs within the set of DGGD. Its purpose is to demystify complex concepts and make them more accessible to users. Implementing the "explain" meta-tag involves breaking down the guidelines into simpler components and describing them in straightforward language. This process includes the use of examples, analogies, and visual aids to enhance understanding. For example, an "explain" meta-tag for an DGGD regarding data privacy might detail how user data is protected and the specific measures in place to ensure compliance with privacy laws. The "help" meta-tag provides practical support and guidance to users navigating the set of DGGD. Its purpose is to direct users to additional resources, tools, and support channels that can assist them in understanding and applying the guidelines. Implementing the "help" meta-tag involves curating a list of relevant resources, such as governance documents, user manuals, FAQs, and support hotlines, and linking them to the corresponding guidelines. This ensures that users have access to the information and assistance they need when they encounter challenges or have questions. For instance, a "help" meta-tag for a guideline on AI fairness might link to a detailed guide on identifying and mitigating bias in AI systems.

The meta-tags "why," "explain," and "help" are integral to the effectiveness of DGGD in promoting ethical and RAI governance. They provide essential contextual information that enhances user understanding, transparency, and compliance. The thoughtful implementation of these meta-tags not only supports users in adhering to governance guidelines but also empowers them to appreciate the ethical principles underlying AI practices.

As AI continues to evolve and integrate into various aspects of society, the importance of these meta-tags in ensuring RAI deployment will become increasingly significant. By incorporating "why," "explain," and "help" meta-tags into DGGD, organizations can build a robust and user-centric governance framework that fosters trust and accountability in AI technologies. The creation of an audit trail in the context of the DGGD Executor's operation against a set of DGGD, which includes the meta-tags "why," "explain," and "help," is a multifaceted process that serves to document the decision-making processes of AI systems meticulously. This documentation is essential for ensuring adherence to the detailed guiderails of an AI governance document. An audit trail captures every action taken by the AI system, providing a clear and traceable record that can be examined to verify compliance with governance principles, assess transparency, and ensure accountability.

Audit Trail

A DGGD audit trail is automatically created as the DGGD Executor processes each DGGD. The "why" meta-tag is critical in this process as it records the rationale behind each decision. This involves documenting the ethical considerations, legal requirements, and societal expectations that inform the action taken. The "explain" meta-tag further enriches the audit trail by offering detailed explanations of how each action was made. Finally, the "help" meta-tag provides context-sensitive practical guidance and support information. By incorporating these meta-tags, the audit trail becomes a comprehensive record that captures the rationale, explanations, and support for each action, thereby enhancing the transparency and accountability of the AI system.

Value of an Audit Trail

The DGGD Audit Trail's value lies in its ability to provide a clear and transparent record of actions taken by the DGGD executor as it actively and autonomously governs the AI system's operations. This transparency is essential for building trust among users and stakeholders, as it allows them to see exactly how governance is actively maintained. The detailed documentation provided by the audit trail also enables thorough scrutiny and review, ensuring that the AI system adheres to ethical standards and governance principles. Moreover, the audit trail serves as a valuable tool for accountability, as it provides a traceable record that can be used to assess compliance and identify any deviations from the established guidelines.

Ensuring Transparency

Transparency is a cornerstone of RAI, and the DGGD audit trail plays a crucial role in ensuring transparency. By documenting the rationale behind each DGGD executor action through the "why" meta-tag, the audit trail provides clear visibility into the governance process. This transparency allows stakeholders to understand the ethical considerations, legal requirements, and societal expectations that inform each DGGD action. Additionally, the detailed explanations provided by the "explain" meta-tag further enhance transparency by making each DGGD action understandable and accessible. This level of transparency is essential for building trust and ensuring that the AI system operates in an open and accountable manner.

Enhancing Explainability

Explainability is another critical aspect of RAI, and the audit trail significantly enhances explainability by providing detailed explanations of each of the DGGD Executor actions. The "explain" meta-tag captures the logic, algorithms, and data inputs used in each DGGD action, making it possible for stakeholders to understand DGGD Action. This level of explainability is essential for identifying and addressing potential issues, such as biases or inaccuracies, in the AI system. By providing clear and comprehensive explanations, the audit trail ensures that the AI system operates in a predictable and understandable manner, thereby enhancing user confidence and trust.

Addressing Ethical Considerations

Ethical considerations are at the heart of RAI, and the DGGD audit trail ensures that these considerations are documented and addressed. The "help" meta-tag provides practical support and guidance, directing users to additional resources and tools for understanding and applying the DGGD Executor. This includes resources for identifying and mitigating biases, understanding the ethical implications of DGGD governance, and ensuring compliance with legal and societal standards. By providing practical support, the DGGD audit trail ensures that the AI system operates in an ethical and responsible manner, adhering to the principles outlined in the AI governance document.

Overcoming AI Shortcomings

The DGGD audit trail also addresses specific shortcomings of AI systems, such as bias and hallucinations. Bias in AI systems can arise from the training data, algorithms, or decision-making processes. The DGGD audit trail allows for the identification and correction of biases by providing a clear record of the data and logic used in the AI system's decisions. By documenting the rationale and explanations for each action, the audit trail helps stakeholders identify potential sources of bias and take corrective action. This ensures that the AI system operates in a fair and unbiased manner, adhering to the principles of RAI.

Mitigating Hallucinations

Hallucinations in AI systems occur when the system generates incorrect or misleading information. The DGGD audit trail addresses this issue by documenting each DGGD actions and providing clear explanations. This allows stakeholders to identify instances where the AI system may have generated hallucinations and take corrective action. By ensuring that the AI system's decisions are transparent and explainable, the audit trail helps prevent the occurrence of hallucinations and ensures the accuracy and reliability of the system's operations.

The automated creation and maintenance of a DGGD audit trail by the DGGD Executor are essential for ensuring adherence to the detailed guiderails of an AI governance document. By incorporating meta-tags such as "why," "explain," and "help," the audit trail provides a comprehensive record of the AI system's decisions, enhancing transparency, explainability, and ethical considerations. This documentation is crucial for overcoming AI shortcomings, such as bias and hallucinations, and ensuring that AI systems operate in a responsible and ethical manner. The novelty of the DGGD audit trail lies in its ability to build trust, ensure accountability, and provide a clear and transparent record of the AI system's operations, creating a trustworthy and accountable AI system.

Context Protocol: The invention employs a standardized framework that is integrated into the DGGD Executor and the invention's agentic framework, configured to enhance contextual awareness during real-time governance enforcement. The context protocol comprises:

Context Capture that collects multimodal contextual data (e.g., user intent, temporal conditions, domain-specific constraints) from stimuli, governance specifications, and external sources (e.g., IoT signals, regulatory updates) using semantic processing and statistical analysis;

Context Structuring that Transforms raw contextual data into a machine-readable context vector, incorporating weighted attributes (e.g., priority of ethical standards, legal constraints) to align with DGGD requirements;

Context Application that dynamically applies the context vector to modulate DGGD selection and enforcement, ensuring responses are tailored to the specific operational domain (e.g., finance, healthcare) and situational factors (e.g., user risk profile, regulatory changes); and, Context Feedback Loop that continuously refines context vectors based on audit trail insights, user feedback, and evolving governance specifications, leveraging online learning algorithms (e.g., Adam, RMSProp) to optimize contextual accuracy.

The context protocol ensures that the OGCEAI system delivers governance-compliant responses that are contextually precise, ethically robust, and adaptable to diverse operational scenarios, enhancing transparency and user trust. For example, in a financial application, the context protocol prioritizes low-risk investment DGGDs for a risk-averse client by weighting contextual attributes like risk tolerance and market volatility.

Agents

The inventive OGCEAI system is built using agents and an agentic framework.

The OGCEAI system is constructed through an agentic framework that leverages a collection of specialized, autonomous agents working collaboratively to transform a NCSRS into an OGCEAI. This framework departs from traditional monolithic architectures by distributing responsibilities across intelligent agents, each tasked with specific functions such as extracting governance directives, managing a directive library, enforcing compliance, monitoring behavior, and supporting users. These agents operate dynamically and in real-time, ensuring that the OGCEAI system adheres to ethical standards, legal requirements, and operational expectations.

The process begins with the extraction of DGGDs from a governance specification, which is handled by an agent that uses technology comprising semantic and statistical processing to interpret and structure the directives. These DGGDs are then aggregated into a DGGD Library, managed by another agent that maintains its integrity and adaptability. A separate set of enforcement and monitoring agents integrates the DGGDs into the NCSRS, continuously observing its behavior and adjusting responses to align with governance principles. An audit trail is generated by an agent that records all actions for transparency and accountability, while user-facing agents provide explanations and support to enhance human interaction with the system. This agentic approach ensures modularity, adaptability, and scalability, allowing the OGCEAI to evolve with changing governance needs and operational contexts.

The agentic framework's strength lies in its ability to operationalize abstract governance principles into concrete, real-time actions. Agents communicate and coordinate through well-defined interfaces (e.g., APIs), enabling seamless integration with the NCSRS and fostering a self-regulating ecosystem. By embedding human oversight and continuous learning mechanisms, the framework ensures that the OGCEAI remains ethically robust and responsive to emerging challenges, such as bias or regulatory updates.

DGGD Extraction Agent

This agent processes a governance specification using natural language processing (NLP) semantic analysis and statistical analysis to derive a set of DGGDs, each enriched with meta-tags ("why," "explain," "help"). The DGGD Extraction Agent translates abstract governance principles (e.g., fairness, transparency) into actionable, machine-readable directives that form the foundation of the OGCEAI's ethical behavior. The DGGD Extraction Agent automates the extraction process, reducing human error and ensuring consistency; and enables rapid adaptation to new governance documents, enhancing system agility.

DGGD Library Management Agent

The DGGD Library Management Agent is an intelligent agent that organizes the DGGDs into a structured, searchable DGGD Library, incorporating version control and impact analysis for updates. The DGGD Library Management Agent maintains a dynamic, up-to-date repository of DGGDs that the OGCEAI can reference for compliance, while tracking changes and assessing their implications, and ensures efficient access to directives, supports auditing through version history, and prevents unintended consequences by analyzing update impacts, enhancing system reliability.

DGGD Enforcement Agent

The DGGD Enforcement Agent monitors the NCSRS's behavior, applies relevant DGGDs, and adjusts outputs to ensure compliance with governance standards. The DGGD Enforcement Agent actively enforces ethical and legal directives by intervening in the NCSRS's response generation process, transforming it into an OGCEAI, thereby providing proactive governance, preventing violations before they occur, and it adapts dynamically to context, improving responsiveness and ethical alignment.

Monitoring Agent

The monitoring agent continuously observes the NCSRS's actions, decisions, and interactions, cross-referencing them with DGGDs to detect deviations. The monitoring agent maintains ongoing oversight of the system's operation, ensuring sustained compliance and identifying areas for improvement, thereby enhancing system safety and reliability by catching issues in real-time, and supporting continuous refinement through observed patterns, fostering ethical consistency.

Audit Trail Generation Agent

The Audit Trail Generation Agent records all actions, including stimuli, applied DGGDs, initial outputs, adjustments, and compliance details, into a comprehensive audit trail.

The Audit Trail Generation Agent documents the OGCEAI's decision-making process, providing a transparent and traceable record for analysis and accountability, thereby Increasing transparency and trust by offering verifiable evidence of ethical operations, and facilitates debugging and improvement, strengthening system integrity.

User Interaction Agent

The User Interaction Agent is user-facing and handles queries, provides explanations of DGGDs and system behavior, and offers tailored support to human users, thereby bridging the gap between the OGCEAI system and its users, ensuring comprehension and effective utilization of the governance framework to improve the user experience and trust through accessible support, and empowers users to engage with the system responsibly, enhancing adoption and accountability.

Sensor Agent

The Sensor Agent interfaces with IoT devices, sensors, and other virtually or directly connected systems by capturing and preprocessing raw stimuli such as temperature readings, motion data, or automated alerts. The Sensor Agent interacts dynamically with devices via standard and specialized protocols, supports real-time responsiveness, and facilitates feedback loops (e.g., recalibrating a malfunctioning sensor), while collaborating with other agents to enforce ethical standards, monitor behavior, and generate audit trails.

The Sensor Agent is focused on transparency and enables the OGCEAI system to ethically handle diverse, sensor-driven inputs, transforming a NCSRS into a responsible AI framework in environments like healthcare, industrial automation, and smart infrastructure.

Real-Time Operational Representation of Governance Document into DGGDs:

The real-time representation of the governance document into DGGD ensures that the principles and guidelines outlined in the governance document are thoroughly operationalized into the DGGD framework, with each DGGD having meaningful meta tags to provide additional context, reasoning, and guidance.

Consider this Short Sample AI Governance Document:

AI systems must adhere to principles of fairness, transparency, and accountability.

Fairness in AI decision making processes should be maintained to ensure no bias.

Transparency in AI operations should be upheld, making them understandable and explainable.

Mechanisms should be in place to address AI related grievances, ensuring accountability.

AI systems must comply with data protection laws, including GDPR.

Consent must be obtained from users before their data is processed.

AI systems should promote inclusivity and prevent discrimination.

AI should be designed to accommodate diverse user needs.

Regular audits of AI systems should be conducted to ensure compliance with standards.

AI systems must be capable of handling exceptions and anomalies.

The Automated Conversion of the Above Sample Document Using the Novel Mechanisms of the Instant Invention Yields the Following DGGDs:

(Principles of Fairness, Transparency, and Accountability)

Text: AI systems must adhere to principles of fairness, transparency, and accountability.

Explain: Ensuring these principles means AI systems operate ethically and build public trust.

Why: Adherence to these principles prevents harm and maintains the integrity of AI operations.

Help: Refer to the AI Ethics Guidelines document for more information.

(Fairness in Decision Making)

Subtext: Fairness in AI decision making processes should be maintained to ensure no bias.

Explain: Fairness ensures that decisions made by AI are just and impartial.

Why: Eliminating bias is essential for equitable treatment of all individuals.

Help: Consult the Fairness in AI Standards manual for detailed practices.

(Transparency in Operations)

Subtext: Transparency in AI operations should be upheld, making them understandable and explainable.

Explain: Transparency means that AI processes are clear and open to scrutiny.

Why: Understandable AI operations foster user trust and accountability.

Help: For guidelines on transparency, see the AI Transparency Framework.

(Addressing AI Related Grievances)

Subtext: Mechanisms should be in place to address AI related grievances, ensuring accountability.

Explain: Grievance mechanisms allow users to report and resolve issues with AI systems.

Why: Handling grievances is crucial for maintaining user trust and system integrity.

Help: Refer to the AI Grievance Redressal Protocol for procedures.

(Compliance with Data Protection Laws)

Text: AI systems must comply with data protection laws, including GDPR.

Explain: Compliance ensures that personal data is handled according to legal standards.

Why: Adhering to data protection laws safeguards user privacy and prevents legal issues.

Help: For compliance guidelines, refer to the Data Protection Compliance Handbook.

(Obtaining User Consent)

Subtext: Consent must be obtained from users before their data is processed.

Explain: Obtaining consent respects user autonomy and legal rights.

Why: User consent is a fundamental aspect of data privacy and ethical AI practices.

Help: See the User Consent Procedures document for detailed instructions.

(Promoting Inclusivity)

Text: AI systems should promote inclusivity and prevent discrimination.

Explain: Inclusivity ensures that AI benefits all users regardless of their background.

Why: Preventing discrimination promotes fairness and equality in AI applications.

Help: Consult the Inclusivity and Anti-Discrimination Guidelines for best practices.

(Designing for Diverse User Needs)

Subtext: AI should be designed to accommodate diverse user needs.

Explain: Designing for diversity means creating AI that serves a wide range of users.

Why: Accommodating diverse needs ensures that AI is accessible and useful to everyone.

Help: Refer to the Inclusive AI Design Framework for detailed design principles.

(Conducting Regular Audits)

Text: Regular audits of AI systems should be conducted to ensure compliance with standards.

Explain: Audits help verify that AI systems adhere to established standards and practices.

Why: Regular audits identify and rectify issues, maintaining system integrity.

Help: See the AI Audit Procedures manual for auditing guidelines.

(Handling Exceptions and Anomalies)

Text: AI systems must be capable of handling exceptions and anomalies.

Explain: Handling exceptions ensures that AI systems can deal with unexpected situations.

Why: Robust exception handling prevents system failures and maintains reliability.

Help: Consult the AI Exception Handling Guide for implementation details.

Role of Human Oversight:

The present invention leverages advanced automation to facilitate the extraction, operationalization, and enforcement of DGGDs. Human oversight is also employed throughout the DGGD lifecycle, from the initial stages of governance specification development to the ongoing monitoring and refinement of the OGCEAI. Human experts review and validate the extracted DGGDs. Human intervention addresses unforeseen circumstances, resolves ambiguities, and makes decisions that require nuanced human judgment and contextual understanding. This novel human-in-the-loop approach to operational real-time governance safeguards against potential biases and unintended consequences, and also fosters a collaborative and iterative process that continuously refines and improves the DGGD framework.

Addressing Bias in the Extraction Process:

The iterative extraction process, which employs sophisticated NLP techniques, necessitates a rigorous examination of potential biases inherent in the NLP models themselves. These models, like any other non-OGCEAI system, are susceptible to biases that may be present in the training data or the underlying algorithms. These biases can inadvertently manifest in the extracted DGGDs, leading to unintended consequences and undermining the very ethical principles they are designed to uphold. To mitigate these risks, the system incorporates robust bias detection and mitigation mechanisms. This involves implementing debiasing techniques and conducting rigorous evaluations to assess and address potential biases in the extracted DGGDs.

The invention employs novel and robust automated real-time bias detection using a multifaceted approach leveraging techniques from statistical learning, natural language processing, and causal inference. DGGD detection pipelines continuously monitor high-dimensional data streams, employing sliding window analysis and adaptive statistical tests (e.g., Kolmogorov-Smirnov, Wilcoxon rank-sum test) to identify statistically significant disparities in outcomes or representations across predefined sensitive attributes (or their proxies inferred through unsupervised learning). Furthermore, embedding spaces derived from transformer architectures are probed in real-time for latent biases encoded within textual or multimodal data. This involves calculating metrics comprising cosine similarity and average distance between embeddings associated with different demographic groups.

The inventive system incorporates causal inference techniques, comprising difference-in-differences and instrumental variables, to distinguish spurious correlations from genuine causal effects of the system's operations on biased outcomes, thereby minimizing false positives and ensuring that detected biases are actionable and not merely reflective of pre-existing societal inequalities present in the training data.

The invention employs automated real-time bias mitigation, operating without human intervention, by the integration of proactive and reactive strategies directly within the system's DGGD Executor's operational loop. The invention's novel proactive mitigation dynamically adjusts model parameters and decision boundaries during consultation based on the continuously detected bias signals. This comprises employing adversarial debiasing techniques in the latent space of neural networks, where gradients are reversed with respect to the sensitive attributes to encourage the learning of bias-invariant representations. Additionally, algorithmic fairness constraints, comprising demographic parity and equalized odds, are directly incorporated into the real-time optimization process, penalizing biased predictions or outcomes.

The invention employs reactive mitigation strategies that dynamically adjust the system's responses or outputs based on detected bias in the immediate context. This includes employing counterfactual generation techniques to produce alternative, unbiased outputs or implementing consultative interventions that modify decisions to satisfy fairness criteria without requiring retraining.

The efficacy of such fully automated bias detection and mitigation hinges on several critical factors. The inventive system maintains a comprehensive and dynamically updated understanding of fairness definitions relevant to the specific application context, through reference to the DGGD Library and adapting these definitions based on evolving societal norms or regulatory requirements.

The invention's automated mitigation strategies are calibrated to avoid introducing new forms of bias or negatively impacting overall system performance. This requires offline evaluation using diverse fairness metrics and stress testing under various adversarial conditions. The inventive system incorporates robust explainability mechanisms through the use of the novel triadic meta-tags to provide transparent justifications for its bias detection and mitigation actions, even in the absence of human oversight. This allows for post-hoc auditing and validation of the system's fairness interventions, building trust and ensuring accountability in its autonomous operation.

The inventive system allows for hum-in-the-loop monitoring and correction.

Continuous Learning and Adaptation:

The dynamic nature of the AI landscape necessitates a continuous learning and adaptation mechanism within the DGGD framework. The ethical landscape is constantly evolving, with new regulations, societal norms, and technological advancements emerging at an unprecedented pace. The inventive system is equipped to adapt to these ongoing changes.

The inventive system employs a novel robust mechanism for incorporating new information, comprising updated governance specifications, emerging ethical guidelines, and lessons learned from previous AI deployments. The inventive system dynamically updates the DGGD library, re-evaluates existing DGGDs, and adjusts enforcement mechanisms.

The OGCEAI achieves continuous learning and adaptation through a sophisticated interplay of online learning paradigms, dynamic knowledge graph evolution, and meta-learning strategies orchestrated by the DGGD Executor. As the OGCEAI interacts with new stimuli and generates responses, these interactions are not merely transactional but serve as continuous data streams for refining its underlying models and knowledge representations. Online learning algorithms, comprising stochastic gradient descent variants with adaptive learning rates and reservoir sampling techniques, Adam (Adaptive Moment Estimation), RMSProp (Root Mean Square Propagation), Adagrad (Adaptive Gradient Algorithm), AdaDelta, Nadam (Nesterov-accelerated Adaptive Moment Estimation), AMSGrad, Momentum-based SGD for managing unbounded data, are employed to incrementally update the parameters of the core models based on the observed stimulus-response pairs and their subsequent evaluation against the DGGDs. This allows the OGCEAI to adapt its predictive capabilities and response generation strategies in real-time, incorporating new information and shifting data distributions without necessitating computationally expensive periodic retraining from scratch.

The OGCEAI's adaptation extends beyond mere parametric updates to its core models. The DGGD Library itself evolves dynamically through a continuous monitoring process of the underlying governance specifications by the DGGD Extractor. As governance documents are updated or new ethical standards emerge, the DGGD Extractor autonomously derives new DGGDs, modifies existing ones, and deprecates outdated directives. This dynamic evolution of the DGGD Library directly influences the DGGD Executor's operational parameters and enforcement mechanisms.

The OGCEAI maintains a dynamic knowledge graph that contextualizes the DGGDs, linking them to specific entities, relationships, and past interactions. This knowledge graph is continuously updated with new information extracted from the ongoing interactions and governance updates, allowing the OGCEAI to refine its understanding of the applicability and implications of each DGGD in novel situations.

To ensure robust and generalizable adaptation, the OGCEAI employs meta-learning techniques. By observing its own learning process and performance across various tasks and governance contexts, the OGCEAI learns to optimize its learning strategies. This includes dynamically adjusting hyperparameters of the online learning algorithms, selecting the most relevant DGGDs for a given context, and even refining the DGGD Extractor's methods for deriving actionable directives from governance specifications.

This "learning to learn" capability enables the OGCEAI to adapt more efficiently and effectively to unforeseen changes in the environment or governance landscape, maintaining compliance and ethical behavior over extended periods without requiring human intervention in the adaptation loop.

The invention claimed is:

1. A hardware and software computer-implemented system for transforming a Non-Compliant System into a Compliant system, the system comprising:

(a) a memory storing machine readable instructions including a governance specification comprising ethical standards, legal requirements, operational methods, and societal expectations;

(b) a directive extractor, including a reducer, a rationalizer, and an assessor, the DGGD directive extractor executed by one or more processors and configured to:
- (i) receive, by the reducer, a first data structure including the governance specification;
- (ii) determine, based on the governance specification, utilizing a semantic analysis, natural language processing (NLP) and statistical processing, a first payload including a plurality of directives, each of the plurality of directives representing a governance concept;
- (iii) determine, based on the semantic analysis and statistical processing, a reduction of the first payload;
- (iv) generate, based on the reduction of the first payload, a second data structure comprising one or more normalized key-value elements keyed by (directive_id, feature_id), the second data structure enabling reuse of intermediate results during enforcement;
- (v) generate, for each directive of the plurality of directives, triadic meta-tags comprising:
  - (A) a "why" meta-tag articulating a rationale for the directive based on the governance specification;
  - (B) an "explain" meta-tag providing a detailed clarification of the directive's application in operational contexts; and
  - (C) a "help" meta-tag offering practical guidance for compliance with the directive;
- (vi) extend each directive with source constraints specifying permissible and impermissible response sources to ensure compliance with the government specification; and
- (vii) assign, by the assessor, a confidence score to each directive based on clarity, specificity, coherence of meta-tags, and reliability of source constraints, using automated evaluation metrics;

(c) a directive Library, stored in the memory, comprising the plurality of directives, configured to be dynamically updated in response to real-time changes in the governance specification;

(d) a Preprocessor, executed by the one or more processors, configured to:
- (i) receive a raw stimulus input to the Non-Compliant System, comprising text-based queries, sensor data, IoT signals, API calls, or multimodal interactions;
- (ii) preprocess the raw stimulus using statistical processing, tokenization, large language model (LLM) summarization, semantic analysis, and noise reduction thereby generating the first data structure optimized for governance-compliant processing; and

- (iii) extract salient features, including keywords, intent, and context, to align the first data structure with the governance specification;

(e) a directive Executor, executed by the one or more processors, configured to:
- (i) receive the first data structure from the Preprocessor;
- (ii) select, from the directive Library, a subset of directives relevant to the first data structure based on semantic processing and confidence scores;
- (iii) monitor, via a feedback loop, an initial response generated by the Non-Compliant System and evaluate the initial response against the subset of directives relevant to the first data structure, using real-time semantic analysis;
- (iv) maintain, in the memory, a dynamic directive Association Map comprising:
  - a first plurality of entities representing criteria that test individual attributes of objects in the memory; and
  - a second plurality of entities representing logical combinations of the criteria,
  - wherein the directive Executor incrementally propagates changes through the first plurality of entities and the second plurality of entities in response to insertions, updates, or removals of data, and reuses intermediate similarity detections thereby minimizing redundant evaluations during directive selection and enforcement;
- (v) adjust, based on the feedback loop, the initial response to generate a compliant response by enforcing the subset of directives, including retrieving data from permissible sources specified in the source constraints and appending the first data structure including the triadic meta-tags to the compliant response to enhance transparency and explainability;
- (vi) verify compliance of the compliant response using semantic processing and real-time feedback mechanisms including the feedback loop, to ensure alignment with the governance specification; and
- (vii) implement a Context Protocol to capture, structure, and apply contextual data from stimuli and governance specifications, the context protocol including:
  - determining, based on the data from stimuli and governance specifications, a context vector including one or more weighted attributes;
  - modulating, based on the context vector, the second data structure by adjusting the subset of directives and/or enforcement for domain-specific, ethically robust responses;
  - refining the context vector via the feedback loop using audit-trail entries; and
  - updating the one or more weighted attributes responsive to the refinement, (f) a bias detection and mitigation module, executed by the one or more processors, configured to:
- (i) detect biases in real-time within the directives and Non-Compliant System responses using statistical tests, embedding space analysis, and causal inference techniques; and
- (ii) mitigate detected biases by applying adversarial debiasing and fairness constraints during response generation to ensure ethical compliance;

(g) an audit trail generation module, executed by the one or more processors, configured to generate an audit trail entry documenting, via the second data structure, the raw stimulus, initial response, selected directive, compliant response, triadic meta-tags, bias mitigation actions, and compliance verification to ensure traceability and accountability, wherein the audit trail entry comprises defined fields including one or more of: timestamp, transaction id, stimulus summary, selected directives, meta-tags, and/or compliance status and wherein the audit trail entry is append-only, providing tamper-evident traceability, and (h) a plurality of autonomous agents, executed by the one or more processors, operating within an agentic framework, comprising:

(i) a directive Extraction Agent to derive the plurality of directives from the governance specification;

(ii) a directive Library Management Agent to maintain and update the directive Library;

(iii) a directive Enforcement Agent to enforce the directives during response generation;

(iv) a Monitoring Agent to continuously observe Non-Compliant System behavior for compliance;

(v) an Audit Trail Generation Agent, in communication with the audit trail generation module, to create the audit trail;

(vi) a Preprocessing Agent to perform the functions of the Preprocessor; and (vii) a User Interaction Agent to provide explanations and support based on the triadic meta-tags; and (viii) a Sensor Agent in communication with one or more IoT devices and/or sensors, the Sensor Agent configured to detect and recalibrate a malfunctioning sensor via the feedback loop that applies the one or more weighted attributes from the context vector and the second data structure, and to commit recalibration events to the Audit Trail Generation Agent, wherein the system transforms the non-compliant system into the compliant system by dynamically enforcing governance-compliant, ethical, and transparent responses in real-time, integrating specific technological processes of AI governance through automated, adaptive, and auditable compliance, and wherein the system is performed by execution of computer readable program code; and non-volatile processing circuitry.

2. The computer-implemented system of claim 1, wherein the reducer enables automated translation of abstract governance principles into actionable directives for real-time enforcement by the directive Executor.

3. The computer-implemented system of claim 2, wherein the directive Extractor further comprises a directive Rationalizer configured to:

(a) receive the first payload or the second payload and the governance specification as input;

(b) consult a large language model (LLM) to generate context-sensitive triadic meta-tags for each directive, comprising:

(i) a "why" meta-tag articulating the rationale behind the governance directive;

(ii) an "explain" meta-tag providing a detailed clarification of the directive's application; and (iii) a "help" meta-tag offering practical guidance or resources for compliance;

(c) include an Meta-Tag Extender configured to:

(i) extend the triadic meta-tags to an n-tuple of meta-tags by generating additional context-sensitive meta-tags, comprising a "Context" meta-tag providing situational details, a "Risk" meta-tag highlighting mitigated risks, a "Stakeholder" meta-tag identifying affected parties, a "Verification" meta-tag documenting validation processes, or a "Feedback" meta-tag suggesting user input mechanisms;

(ii) generate the additional meta-tags using the large language model in the same manner as the triadic meta-tags;

(iii) associate the n-tuple of meta-tags with the respective directive; and (d) append the n-tuple of meta-tags, including the triadic meta-tags and the additional meta-tags, to each directive in a label: text format;

wherein the n-tuple of meta-tags provides transparency, explainability, risk awareness, inclusivity, validation, and user engagement during operations.

4. The computer-implemented system of claim 3, wherein the directive Extractor further comprises a Descriptor Extender configured to:

(a) analyze the governance specification to identify source-related requirements;

(b) append source constraint descriptors to each directive, specifying permissible sources and impermissible sources for response generation; and (c) dynamically update the source constraints in response to changes in the governance specification;

wherein the Descriptor Extender ensures that system responses are derived from governance-compliant sources, mitigating risks of misinformation, bias, or privacy breaches.

5. The computer-implemented system of claim 4, wherein the assessor is further configured to:

(a) evaluate each directive based on:

(i) disambiguation and specificity of the source text using NLP and semantic analysis;

(ii) coherence of the triadic meta-tags using a large language model; and (iii) reliability of source constraints using predefined quality metrics;

(b) assign, based on evaluating each directive, a numerical confidence score to each directive; and (c) store the confidence score within the directive in the directive Library;

wherein the confidence score enables the directive Executor to prioritize high-confidence directives during real-time enforcement, improving compliance accuracy.

6. The computer-implemented system of claim 1, wherein the bias detection and mitigation module is further configured to:

(a) employ real-time statistical tests, including Kolmogorov-Smirnov and Wilcoxon rank-sum tests, to detect disparities in directive outcomes across sensitive attributes;

(b) probe embedding spaces derived from transformer architectures to identify latent biases in textual or multimodal data; and (c) apply causal inference techniques, including difference-in-differences and instrumental variables, to distinguish spurious correlations from causal effects;

wherein the module ensures proactive identification and mitigation of biases, enhancing the fairness of compliant system responses.

7. The computer-implemented system of claim 1, wherein the audit trail generation module is further configured to:

(a) record, for each stimulus-response interaction:

(i) a timestamp and transaction identifier;

(ii) the preprocessed stimulus and initial Non-Compliant System output;

(iii) the selected directives and their associated triadic meta-tags;

(iv) the adjusted compliant response and compliance verification status; and (v) any bias mitigation actions taken;

(b) store the audit trail in the second data structure; and (c) append the triadic meta-tags to the audit trail entries to provide context-sensitive rationales;

wherein the audit trail enhances transparency, traceability, and accountability of system operations.

8. The computer-implemented system of claim 1, wherein the Sensor Agent is further configured to:

(a) interface with the one or more Internet of Things (IoT) devices, sensors, or connected systems to capture raw stimuli, including temperature readings, motion data, or automated alerts;

(b) preprocess the raw stimuli using statistical processing and semantic analysis; and (c) collaborate with the directive Enforcement Agent and Monitoring Agent to enforce directives and generate audit trails;

wherein the Sensor Agent enables the complaint system to ethically handle diverse, sensor-driven inputs in real-time applications.

9. The computer-implemented system of claim 1, further comprising a continuous learning module configured to:

(a) monitor updates to the governance specification and incorporate new ethical guidelines or regulatory changes;

(b) employ online learning algorithms, comprising stochastic gradient descent with adaptive learning rates, Adam (Adaptive Moment Estimation), RMSProp (Root Mean Square Propagation), Adagrad (Adaptive Gradient Algorithm), AdaDelta, Nadam (Nesterov-accelerated Adaptive Moment Estimation), AMSGrad, Momentum-based SGD to update directive enforcement parameters;

(c) maintain a dynamic knowledge graph linking directives to entities, relationships, and past interactions; and (d) apply meta-learning techniques to optimize learning strategies across governance contexts;

wherein the continuous learning module ensures the system adapts dynamically to evolving ethical and operational requirements without requiring retraining.

10. A hardware and software computer-implemented method for transforming a Non-Compliant System into a Compliant System, the method comprising:

(a) storing, in a memory, a governance specification comprising ethical standards, legal requirements, operational methods, and societal expectations;

(b) executing, by one or more processors, an Extractor including a reducer and an assessor, the directive Extractor configured to:

(i) receive, by the reducer, a first data structure including the governance specification;

(ii) determine, based on the governance specification, utilizing a semantic analysis, natural language processing (NLP) and statistical processing, a first payload including a plurality of directives, each directive representing a governance concept;

(iii) determine, based on the semantic analysis and statistical processing, a reduction of the first payload;

(iv) generate, based on the reduction of the first payload, a second data structure comprising one or more normalized key-value elements keyed by (directive_id, feature_id), the second data structure enabling reuse of intermediate results during enforcement;

(v) generate, for each directive, triadic meta-tags comprising:

(A) a "why" meta-tag articulating a rationale for the directive based on the governance specification;

(B) an "explain" meta-tag providing a detailed clarification of the directive's application in operational contexts; and (C) a "help" meta-tag offering practical guidance for compliance with the;

(vi) extend each directive with source constraints specifying permissible and impermissible response sources to ensure compliance with the governance specification; and (vii) assign, by the assessor, a confidence score to each directive based on clarity, specificity, coherence of meta-tags, and reliability of source constraints, using automated evaluation metrics;

(c) maintaining, in the memory, a directive Library comprising the plurality of directives, configured to be dynamically updated in response to real-time changes in the governance specification;

(d) executing, by the one or more processors, an Preprocessor configured to:

(i) receive a raw stimulus input to the Non-Compliant System, comprising text-based queries, sensor data, IoT signals, API calls, or multimodal interactions;

(ii) preprocess the raw stimulus using statistical processing, tokenization, large language model (LLM) summarization, semantic analysis, and noise reduction thereby generating the first data structure-optimized for governance-compliant processing; and (iii) extract salient features, including keywords, intent, and context, to align the first data structure structured representation with the governance specification;

(e) executing, by the one or more processors, a directive Executor configured to:

(i) receive the first data structure from the Preprocessor;

(ii) select, from the directive Library, a subset of directives relevant to the first data structure based on semantic processing and confidence scores;

(iii) monitor, via a feedback loop, an initial response generated by the Non-Compliant System and evaluate the initial response against the selected subset of directives relevant to the first data structure;

(iv) maintain, in the memory, a dynamic directive Association Map comprising:

a first plurality of entities representing criteria that test individual attributes of objects in the memory; and a second plurality of entities representing logical combinations of the criteria, wherein the directive Executor incrementally propagates changes through the first plurality of entities and the second plurality of entities in response to insertions, updates, or removals of data, and reuses intermediate similarity detections thereby minimizing redundant evaluations during directive selection and enforcement;

(vi) adjust, based on the feedback loop, the initial response to generate a compliant response by enforcing the selected subset of directive, including retrieving data from permissible sources specified in the source constraints and appending the first data structure including the triadic meta-tags to the compliant response to enhance transparency and explainability;

(vii) verify compliance of the compliant response using semantic processing and real-time feedback mechanisms including the feedback loop, to ensure alignment with the government specification; and (viii) implement a Context Protocol to capture, structure, and apply contextual data from stimuli and governance specifications, the context protocol including:

determining, based on the data from stimuli and governance specifications, a context vector including one or more weighted attributes;

modulating, based on the context vector, the second data structure by adjusting the subset of directive selection and/or enforcement for domain-specific, ethically robust responses;

refining the context vector via the feedback loop using audit-trail entries; and updating the one or more weighted attributes responsive to the refinement;

(f) executing, by the one or more processors, a bias detection and mitigation module configured to:

(i) detect biases in real-time within the directives and Non-Compliant System responses using statistical tests, embedding space analysis, and causal inference techniques; and (ii) mitigate detected biases by applying adversarial debiasing and fairness constraints during response generation to ensure ethical compliance;

(g) executing by the one or more processors, an audit trail generation module configured to generate an audit trail documenting, via the second data structure, the raw stimulus, initial response, selected directives, compliant response, triadic meta-tags, bias mitigation actions, and compliance verification, wherein the audit trail entry comprises defined fields including one or more of: timestamp, transaction id, stimulus summary, selected directives, meta-tags, and/or compliance status and wherein the audit trail entry is append-only, providing tamper-evident traceability; and (h) executing by the one or more processors, a plurality of autonomous agents within an agentic framework utilizing the first data structure and the second data structure, comprising:

(i) a directive Extraction Agent to derive the plurality of directives from the governance specification;

(ii) a directive Library Management Agent to maintain and update the directive Library in real-time;

(iii) a directive Enforcement Agent to enforce the directives during response generation;

(iv) a Monitoring Agent to continuously observe Non-Compliant System behavior for compliance;

(v) an Audit Trail Generation Agent to create the audit trail;

(vi) a Preprocessing Agent to perform the functions of the Preprocessor; and (vii) a User Interaction Agent to provide explanations and support based on the triadic meta-tags; and (viii) a Sensor Agent in communication with one or more IoT devices and/or sensors, the Sensor Agent configured to detect and recalibrate a malfunctioning sensor via the feedback loop that applies the one or more weighted attributes from the context vector and the second data structure, and to commit recalibration events to the Audit Trail Generation Agent;

wherein the method transforms the Non-Compliant System into the compliant system by dynamically enforcing governance-compliant, ethical, and transparent responses in real-time, integrating specific technological processes of AI governance through automated, adaptive, and auditable compliance, and wherein the method is performed by execution of computer readable program code; and non-volatile processing circuitry.

11. The computer-implemented method of claim 10, wherein the reducer enables automated translation of abstract governance principles into actionable directives for real-time enforcement by the directive Executor.

12. The computer-implemented method of claim 11, wherein the directive Extractor further comprises a directive Rationalizer configured to:

(a) receive the first payload or the second payload and the governance specification as input;

(b) consult a large language model (LLM) to generate context-sensitive triadic meta-tags for each directive, comprising:

(i) a "why" meta-tag articulating the rationale behind the governance directive;

(ii) an "explain" meta-tag providing a detailed clarification of the directive's application; and (iii) a "help" meta-tag offering practical guidance or resources for compliance;

(c) include an Meta-Tag Extender configured to:

(i) extend the triadic meta-tags to an n-tuple of meta-tags by generating additional context-sensitive meta-tags, comprising a "Context" meta-tag providing situational details, a "Risk" meta-tag highlighting mitigated risks, a "Stakeholder" meta-tag identifying affected parties, a "Verification" meta-tag documenting validation processes, or a "Feedback" meta-tag suggesting user input mechanisms;

(ii) generate the additional meta-tags using the large language model in the same manner as the triadic meta-tags;

(iii) associate the n-tuple of meta-tags with the respective directive; and (d) append the n-tuple of meta-tags, including the triadic meta-tags and the additional meta-tags, to each directive in a label: text format;

wherein the n-tuple of meta-tags provides transparency, explainability, risk awareness, inclusivity, validation, and user engagement during complaint system operations.

13. The computer-implemented method of claim 12, wherein the extractor further comprises a Descriptor Extender configured to:

(a) analyze the governance specification to identify source-related requirements;

(b) append source constraint descriptors to each directive, specifying permissible sources and impermissible sources for response generation; and (c) dynamically update the source constraints in response to changes in the governance specification, wherein the Descriptor Extender ensures that system responses are derived from governance-compliant sources, mitigating risks of misinformation, bias, or privacy breaches.

14. The computer-implemented method of claim 13, wherein the assessor is further configured to:

(a) evaluate each directive based on:

(i) disambiguation and specificity of the source text using NLP and semantic analysis;

(ii) coherence of the triadic meta-tags using a large language model; and (iii) reliability of source constraints using predefined quality metrics;

(b) assign, based on evaluating each directive, a numerical confidence score to each directive; and (c) store the confidence score within the directive in the directive Library;

wherein the confidence score enables the directive Executor to prioritize high-confidence directives during real-time enforcement, improving compliance accuracy.

15. The computer-implemented method of claim 10, wherein the bias detection and mitigation module is further configured to:

(a) employ real-time statistical tests, including Kolmogorov-Smirnov and Wilcoxon rank-sum tests, to detect disparities in directive outcomes across sensitive attributes;

(b) probe embedding spaces derived from transformer architectures to identify latent biases in textual or multimodal data; and (c) apply causal inference techniques, including difference-in-differences and instrumental variables, to distinguish spurious correlations from causal effects;

wherein the module ensures proactive identification and mitigation of biases, enhancing the fairness of system responses.

16. The computer-implemented method of claim 10, wherein the audit trail generation module is further configured to:

(a) record, for each stimulus-response interaction:

(i) a timestamp and transaction identifier;

(ii) the preprocessed stimulus and initial Non-Compliant System output;

(iii) the selected directives and their associated triadic meta-tags;

(iv) the adjusted compliant response and compliance verification status; and (v) any bias mitigation actions taken;

(b) store the audit trail via the second data structure; and (c) append the triadic meta-tags to the audit trail entries to provide context-sensitive rationales; wherein the audit trail enhances transparency, traceability, and accountability of system operations.

17. The computer-implemented method of claim 10, wherein the sensor Agent is further configured to:

(a) interface with the one or more Internet of Things (IoT) devices, sensors, or connected systems to capture raw stimuli, including temperature readings, motion data, or automated alerts;

(b) preprocess the raw stimuli using statistical processing and semantic analysis; and (c) collaborate with the directive Enforcement Agent and Monitoring Agent to enforce directives and generate audit trails, wherein the Sensor Agent enables the system to ethically handle diverse, sensor-driven inputs in real-time applications.

18. The computer-implemented method of claim 10, further comprising a continuous learning module configured to:

(a) monitor updates to the governance specification and incorporate new ethical guidelines or regulatory changes;

(b) employ online learning algorithms, comprising stochastic gradient descent with adaptive learning rates, Adam (Adaptive Moment Estimation), RMSProp (Root Mean Square Propagation), Adagrad (Adaptive Gradient Algorithm), AdaDelta, Nadam (Nesterov-accelerated Adaptive Moment Estimation), AMSGrad, Momentum-based SGD to update directive enforcement parameters;

(c) maintain a dynamic knowledge graph linking directives to entities, relationships, and past interactions; and (d) apply meta-learning techniques to optimize learning strategies across governance contexts;

wherein the continuous learning module ensures the system adapts dynamically to evolving ethical and operational requirements without requiring retraining.

* * * * *